(12) United States Patent
Lochhead et al.

(10) Patent No.: US 12,231,264 B2
(45) Date of Patent: Feb. 18, 2025

(54) AUTOMATED CLOUD ON-RAMP IN A DATA CENTER

(71) Applicant: Cyxtera Data Centers, Inc., Coral Gables, FL (US)

(72) Inventors: Jason Anthony Lochhead, Frisco, TX (US); Manikandan Subramanian, Flower Mound, TX (US); Adam Scott Wayne, Keller, TX (US)

( * ) Notice: Subject to any disclaimer, the term of this patent is extended or adjusted under 35 U.S.C. 154(b) by 455 days.

(21) Appl. No.: 17/679,975

(22) Filed: Feb. 24, 2022

(65) Prior Publication Data
US 2023/0269114 A1 Aug. 24, 2023

(51) Int. Cl.
| H04L 12/28 | (2006.01) |
| H04L 12/46 | (2006.01) |
| H04L 41/0896 | (2022.01) |
| H04L 43/04 | (2022.01) |
| H04L 43/08 | (2022.01) |
| H04L 101/622 | (2022.01) |

(52) U.S. Cl.
CPC ........ *H04L 12/467* (2013.01); *H04L 41/0896* (2013.01); *H04L 43/04* (2013.01); *H04L 43/08* (2013.01); *H04L 2101/622* (2022.05)

(58) Field of Classification Search
CPC .................................................... H04L 12/467
See application file for complete search history.

(56) References Cited

U.S. PATENT DOCUMENTS

| 6,963,916 B1 * | 11/2005 | Pugaczewski | ...... H04L 41/0806 |
| | | | 709/227 |
| 10,355,989 B1 * | 7/2019 | Panchal | .................. H04L 67/10 |

(Continued)

FOREIGN PATENT DOCUMENTS

| CA | 2951940 C | * | 11/2018 | ......... H04L 12/4633 |
| CA | 2951939 C | * | 4/2023 | ............... G06F 8/30 |
| EP | 3155759 B1 | * | 9/2019 | ......... H04L 12/4633 |

OTHER PUBLICATIONS

International Search Report and Written Opinion, PCT/US2023/011638, May 11, 2023.

(Continued)

*Primary Examiner* — Elisabeth Benoit Magloire
(74) *Attorney, Agent, or Firm* — Greenberg Traurig

(57) ABSTRACT

Systems, methods and computer-readable storage media are provided for provisioning network inter-connections and extensions to computing infrastructure. In one embodiment, a system can receive a request from a client to establish a network connection between a private network and a remote network, the request including a selection of a virtual network residing at the private network; establish a transit connection between the virtual network and an exchange port established in association with the private network; establish a first network connection between the exchange port and an intermediary cross connect network; establish a second network connection between the intermediary cross connect network and the remote network; and extend a virtual local area network (VLAN) connected to the virtual network of the client at the private network to the remote network via the network connection, the network connection comprising the first network connection and the second network connection.

20 Claims, 13 Drawing Sheets

(56) References Cited

U.S. PATENT DOCUMENTS

| | | | | |
|---|---|---|---|---|
| 10,742,721 | B1* | 8/2020 | Wagner | H04L 67/10 |
| 2010/0272110 | A1* | 10/2010 | Allan | H04L 45/02 |
| | | | | 370/395.53 |
| 2013/0114465 | A1 | 5/2013 | Mcgovern | |
| 2020/0099610 | A1* | 3/2020 | Heron | H04L 45/34 |
| 2020/0366528 | A1 | 11/2020 | Ritchie | |
| 2021/0258190 | A1 | 8/2021 | Sridhar et al. | |

OTHER PUBLICATIONS

Jose Ignacio Aznar et al., "OpenNaaS-based networking solution for DC automated management", In: 2014 IEEE 3rd International Conference on Cloud Networking (CloudNet), Dec. 1, 2014.

Yufeng Xin et al., "Scaling up applications over distributed clouds with dynamic layer-2 exchange and broadcast service", In: 2014 26th International Teletraffic Congress (ITC), Oct. 23, 2014.

* cited by examiner

Digital Exchange > Dallas, TX > Order Connection

[← Back]

Create New Connection
Seamlessly connect to public clouds, deploy site-to-site connections between metros, and extend virtual networks to other customers on the Digital Exchange. Learn More about connections on Digital Exchange →

⊘ Choose Connection

▲ Azure ⊗
Microsoft Azure
Build, test, deploy, and manage your applications.

Order Summary

Cloud On-ramp ∧
Account: BAN889182
Metro: San Francisco, CA
Quantity: 1
Monthly charge: 200 USD

[Checkout →]
[Order Summary ⇩]

⊘ Select a virtual network
Connection Name
[Azure onramp]
Choose Virtual Network
[Select Existing] [Create New]
Virtual Network
[Cloud(301) ∨]

⊘ Configure Connection
Microsoft Azure [Login Successful]
To connect to Microsoft Azure you will need to create an ExpressRoute circuit. Your ExpressRoute circuit will act as the Z-end of your Cloud On-ramp connection, allowing network traffic from your Cloud On-ramp provider to terminate in your Microsoft Azure subscription.
We can help you provision your ExpressRoute circuit. We'll need you to allow temporary access to your Microsoft Azure subscription to automate the provisioning. Once you've logged into Microspft Azure, we'll walk through a few questions to configure your new circuit.

[Sign in with Microsoft Azure]

──────────── OR ────────────

ExpressRoute Service Key
[0800fc577294c34e0b28ad] [Update Service Key] [View Manual Set Up Steps 🗐]
Availability Zone (ExpressRoute port)    Provider
[Auto-selected - (San Antonio Primary 'xxxxx') ∨]  [Megaport]

FIG. 5A

AUTOMATED CLOUD ON-RAMP IN A DATA CENTER

FIELD OF THE TECHNOLOGY

At least some embodiments disclosed herein relate to computer network configuration in general and more particularly, but not limited to automated extension of private networks with remote cloud computing platforms.

BACKGROUND

Data center providers furnish services to various entities such as corporations, government agencies, individual customers, and the like, to access computing resources hosted thereat. By tasking a data center to host its computing resources, an entity can benefit from flexibility, scalability, and efficiency in resource allocation and yet achieve a reduced operating cost associated therewith.

Oftentimes, a data center provider virtualizes some or all of its computing resources to provide private clouds or networks specific to customers. As a result, the data center provider can dynamically scale hardware and software resources to meet the needs and requirements of its customers. Nowadays, with the ever-growing popularity of public clouds, customers of data centers are enticed to migrate workloads from their private network hosted in a data center (e.g., private processing) to a public cloud (e.g., public Azure, federal Azure) provided by cloud providers such as Microsoft Azure, Amazon Web Services (AWS), Google Cloud, IBM Cloud, Alibaba Cloud, and/or another private cloud provided by another data center. As such, it is common practice for customers to run their workloads in a hybrid mode involving both their private network (on-premise of a data center) and other public clouds/private networks (off-premise of a data center).

Accordingly, the ability to streamline and automate the connection between the private network over one or more public clouds/private networks in one or more regions (e.g., different cities, states, countries, etc.) in a seamless manner would facilitate customers of a data center to adapt and take full advantage of the modern distributed computing infrastructure, while retaining controls as needed in collocated infrastructure. Further, over the automated extension of a customer's private network across several public clouds, the ability to monitor services running in the remote cloud would further facilitate and enhance the hybrid processing operations of customers of the data center.

BRIEF DESCRIPTION OF THE DRAWINGS

References are made to the accompanying drawings that form a part of this disclosure and that illustrate embodiments in which the systems and methods described in this Specification can be practiced.

FIGS. 5A-5D show portions of example graphic user interfaces (GUIs) for provisioning services and interconnecting networks, according to one embodiment.

DETAILED DESCRIPTION

Figure 1:
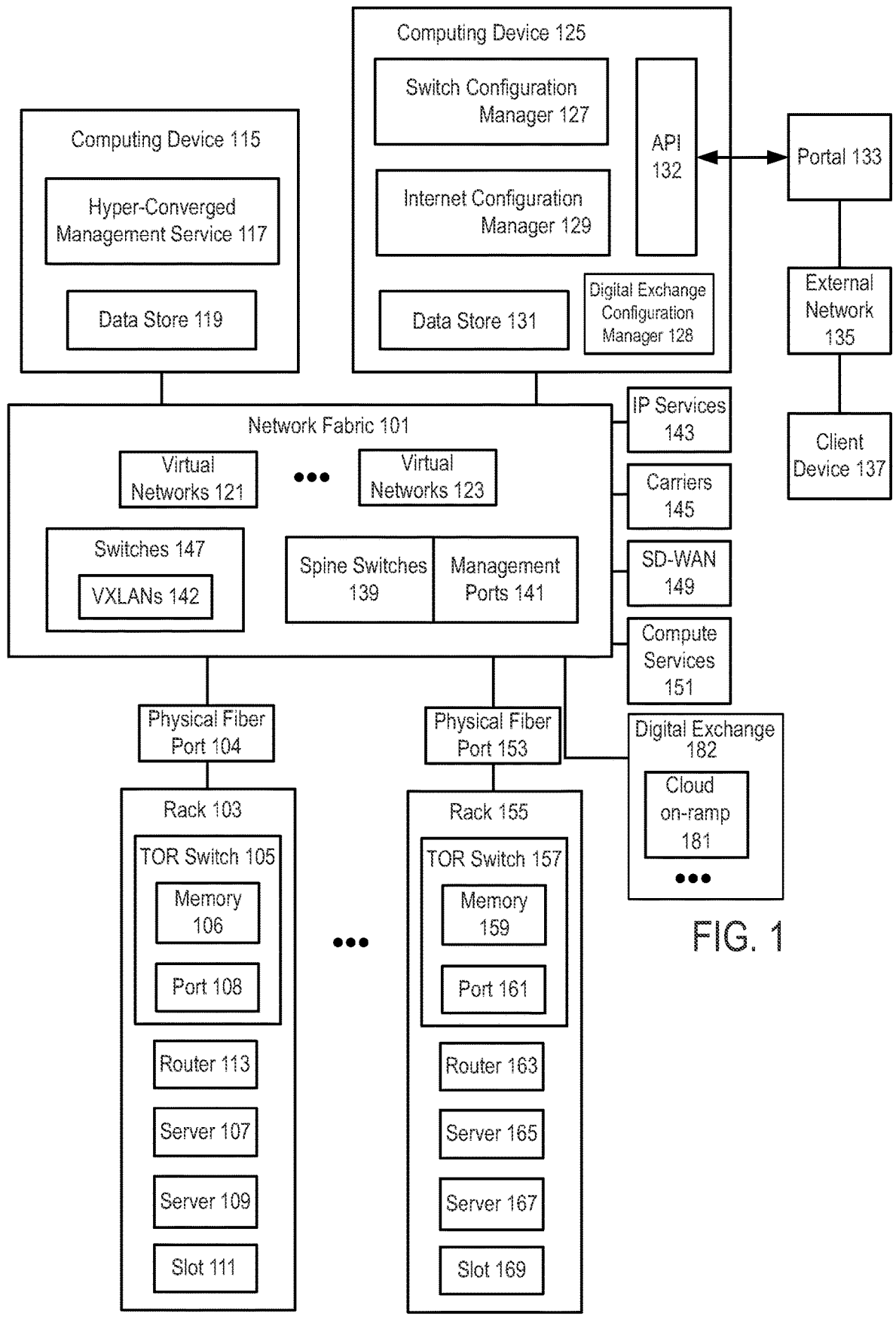
FIG. 1 shows an example data center that includes a network fabric and a digital exchange connecting colocation computing environment and on-demand infrastructure/services from service providers, according to one embodiment.

At least some embodiments herein relate to configuring a network in a data center into an extended connection with a remote cloud network. In one example, the network includes a private network implementing a virtual network such as a virtual local area network (VLAN). Alternatively and/or additionally, other types of networks can be configured. In one example, the remote cloud network is a public cloud platform. In another example, the remote cloud network is a private cloud platform provided at a remote data center.

A significant problem with existing data centers is caused by a popular trend of its customers running their workloads in a hybrid mode involving both their private networks hosted on-premise at a data center and a public/private cloud hosted off-premise at a remote network. In a hybrid mode, two or more separate computing infrastructures may interoperate by standardized or proprietary technologies that enable data and application portability to handle bursting for load balancing between networks, dynamically expand service capacity to support peak workloads, extend service capacity to geographic locations closer to customers, ensure off-premise service continuity and disaster discovery, among achieving other improvements and benefits.

In order to connect with such remote public or private clouds that are oftentimes hosted in geographically remote locations, customers of a data center have to manually configure not only the connectivity at both network endpoints, but also intermediary connecting-through network platforms. For example, to deploy a service for executing in both a private network at a data center and a remote public cloud across multiple intermediary networks, a customer may be required to configure the service in the private network, configure a connectivity relationship with each of the intermediary networks, as well as configure the service at the remote cloud. As a result, none of these tasks can be completed quickly and accurately, rendering the provisioning of extended network connectivity and services time-consuming and error-prone.

Another problem is difficulty in accurately and timely monitoring bandwidth and overall IT performance for running workloads in a hybrid computing environment. This results in over-provisioning or under-provisioning that lacks responsiveness to real time performance in a hybrid computing environment that is susceptible to various conditions out of the control of a local data center.

Various embodiments described below provide a technological solution to one or more of the above technical problems. In one embodiment, a method includes: receiving a request from a client to establish a network connection between a private network and a remote network, the request including a selection of a virtual network residing at the private network; establishing a transit connection between the virtual network and an exchange port established in association with the private network; establishing a first network connection between the exchange port and an intermediary cross connect network; establishing a second network connection between the intermediary cross connect network and the remote network; and extending a virtual local area network (VLAN) connected to the virtual network of the client at the private network to the remote network via the network connection, the network connection comprising the first and second network connections.

In light of the above, automating configuration of networks in a data center with cross-network cloud extensions can provide one or more various advantages. For example, customer colocation access can be augmented with additional cloud networks remote from the data center more quickly than using prior approaches. For example, an extended cloud connection can be provisioned within minutes at a configuration portal of the data center. As a result, services that require the computing resources (e.g., server, storage, networking) provided at the remote clouds can be deployed more quickly and dynamically than using prior approaches.

Other advantages can include, for example, one or more of the following:

Provisioning computing infrastructure hybrid of geographically remote public or private cloud networks in a shorter period of time and in a seamless and error free manner.

Automating the extending of colocation computing environments and connectivity with on-ramp remote public or private cloud networks in different geographic locations.

Retaining full control by the customer over its network and compute environment.

Reducing complexity in provisioning network ports interconnecting networks and devices across multiple network platforms and data centers.

Enabling monitoring for services running in a hybrid mode involving both a data center and remote extensions of public or private cloud networks.

Configuring placement and deployment algorithms on the fly.

FIG. 1 shows an example data center that includes a network fabric 101 and a digital exchange 182 connecting colocation computing environments and on-demand infrastructure/services from service providers into a unified physical and digital computing infrastructure, according to one embodiment. Exemplary unified computing environment can include services from IP services 143, telecommunication carriers 145, software defined wide area network (SD-WAN), compute services 151, digital exchange 182, as well as colocation infrastructure comprising top-of-rack (TOR) switches 105, 157 for racks 103, 155 in which various local computing equipment is mounted. In one embodiment, the computing equipment mounted in rack 103 includes the TOR switch 105, and also servers 107, 109, and router 113. Rack 103 has a slot 111 in which additional equipment can be mounted (e.g., slot 111 and/or other slots can be used by a customer of the data center to install customer-owned equipment in rack 103).

TOR switch 105 includes memory 106 and various ports (e.g., port 108) for receiving and sending communications (e.g., data packets). Memory 106 stores a network configuration (e.g., port connection assignments) as implemented by switch configuration manager 127 over network fabric 101 in response to a customer request received over a portal 133. Various ports of TOR switch 105 connect to router 113 and/or servers 107, 109. Other ports of TOR switch 105 connect to one or more virtual networks 121, 123 of network fabric 101. In one embodiment, all communications between rack 103 and network fabric 101 pass through a physical fiber port 104 (e.g., implemented using single-mode fiber).

Rack 155 mounts computer equipment including the TOR switch 157, servers 165, 167, and router 163. Rack 155 includes a slot 169 for adding additional equipment. TOR switch 157 includes memory 159 and various ports, including port 161. Similarly as for rack 103, all communications to and from the network fabric 101 pass through a physical fiber port 153. Also, similarly as for rack 103, memory 159 is used to store data regarding a configuration of TOR switch 157 as automatically implemented by switch configuration manager 127. In one example, this configuration is implemented in response to a selection made by a customer in a user interface of client device 137. The data center of FIG. 1 can include numerous other racks connected to network fabric 101 using physical fiber ports and/or other types of connections.

The virtual networks 121, 123 of network fabric 101 can overlay various types of physical network switches. In one embodiment, network fabric 101 comprises network switches 147 that are used to implement virtual extensible local area networks (VXLANs) 142 for transmission of data from a server of rack 103 to a server mounted in a different rack, such as rack 155. In one example, a virtual network connected to TOR switch 105 is converted into a VXLAN 142 for transmission of data from server 107 to server 165. The VXLAN 142 is used to transmit the data to another virtual network connected to TOR switch 157. VXLANs 142 can be configured by switch configuration manager 127 to implement the foregoing connection between servers. In one embodiment, this configuration is implemented in response to a request from client device 137 to add server 165 to a virtual network that includes server 107.

In one embodiment, network fabric 101 includes spine switches 139 as part of a physical switching fabric. Spine switches 139 include management ports 141, which can be used by switch configuration manager 127 to configure spine switches 139.

In one example, network fabric 101 is a leaf-spine data center switching fabric. In one example, network fabric 101 is a software-defined network (SDN) controller-based data center switching fabric. In one example, the switching fabric supports all workloads (e.g., physical, virtual machine, and container) and choice of orchestration software. The switching fabric provides layer 2 (L2) switching, and layer 3 (L3) routing. In one example, the switching fabric is scalable, resilient, has no single point of failure, and/or supports headless mode operations.

In one embodiment, a computing device 115 (e.g., a server or virtual machine) is connected to network fabric 101. Computing device 115 executes a hyper-converged management service 117, which can be used to allocate compute, memory, and/or storage resources provided by various racks, including rack 103 and/or rack 155. Data store 119 is used to store data regarding this allocation of resources.

In one embodiment, a customer installs its own equipment into rack 103. Using client device 137, the customer sends a request for additional resources to add to its computing environment in the data center. In response to this request, hyper-converged management service 117 allocates resources of servers in rack 155 for use by the customer. In one example, virtual machines are created on rack 155 for handling workloads of the customer.

In one embodiment, a computing device 125 is connected to network fabric 101.

Switch configuration manager 127 executes on computing device 125 and performs various administrative functions for the data center (e.g., functions as described above). Digital exchange configuration manager 128 also executes on computing device 125 and performs various administrative functions related to configuring and management of digital exchange 182 for the data center. Some of the functions performed by switch integration manager 127 and digital exchange configuration manager 128 are responsive to communications received from client device 137 over an external network 135 through portal 133. Client device 137 uses API 132 of switch configuration manager 127 for these communications. Client device 137 also receives communications from switch configuration manager 127 and digital exchange configuration manager 128 using API 132. In one example, one or more of the communications cause a display of information in a user interface of client device 137. In one example, the user interface uses the information to display a configuration of an on-premise computing environment of a customer of the data center, as well as a configuration of an off-premise (extension with remote computing resources) computing environment of the same.

In one embodiment, in response to a communication from client device 137, switch configuration manager 127 creates and/or configures various virtual networks of network fabric 101 (e.g., virtual networks 121, 123, and/or VXLANs 142). In one example, certain virtual networks are assigned to a group as designated by a customer using client device 137. Data regarding creation and/or configuration of virtual networks (e.g., assignment of virtual networks to a group(s)) is stored in data store 131.

In one embodiment, a customer of the data center can use client device 137 to request internet connectivity for one or more racks in its computing environment. For example, the customer can request that internet connectivity be provided for use by servers 107, 109. Communications with client device 137 regarding internet connectivity also can be performed using API 132. In response to this request, internet configuration manager 129 can configure IP services 143 to provide this internet connectivity. Internet configuration manager 129 communicates configuration data needed by switch configuration manager 127 for configuring TOR switch 105 so that servers 107, 109 are connected to IP services 143, which provides the internet connectivity. Configuration data regarding this internet connectivity can also be stored in data store 131.

In one embodiment, the customer can request that one or more telecommunications carriers 145 be connected to racks in its computing environment (e.g., rack 103 or rack 155).

In one embodiment, the customer can request that servers in rack 103 or rack 155 be connected to a software-defined wide area network (SD-WAN) 149. In one example, SD-WAN 149 is used by a customer to extend its computer networks over large distances, to connect remote branch offices to data centers and each other, and/or to deliver applications and services required to perform various business functions.

In one embodiment, the customer can request compute services 151. In one example, compute services 151 include one or more virtual machines created for use in the customer's computing environment. In one example, the virtual machines are created and run on servers in racks of the data center. For example, hyper-converged management service 117 can create and manage these virtual machines.

In another example, compute services 151 include storage resources. The storage resources can be non-volatile memory devices mounted in racks of the data center (e.g., mounted in rack 155).

In one embodiment, the customer can request that servers in rack 103 or rack 155 be connected to cloud on-ramp 181 provided through digital exchange 182. In one example, cloud on-ramp 181 includes one or more of public clouds provided by cloud service providers and/or private clouds hosted at other data centers. In one example, connectivity to cloud on-ramp 181 is established via one or more cross connect providers (e.g., cloud on-ramp providers, network providers) as intermediary networks.

In one embodiment, network fabric 101 is configured in communication with digital exchange 182 that interfaces with various service providers and partners to provide additional computing resources from which the customer can request services. In one example, in addition to above-described IP service 143, telecommunication carriers 145, SD-WAN 149, compute services 151, and cloud on-ramp 181, digital exchange 182 can interface providers to provide various services including, but not limited to, various services implemented as SasS, NaaS, PassS, XaaS, and the like.

In one embodiment, a virtualization control system (e.g., implemented by hyper-converged management service 117 or otherwise by computing device 115) abstracts server, storage, and network hardware resources of the data center to provide a more granular virtual server, virtual storage, and virtual network resource allocation that can be accessed by a customer. A customer console provisioning interface is coupled to the virtualization control system to permit the customer to configure its new environment. In one example, the virtualization control system responds to requests received from client device 137. In another embodiment, the virtualization control system further abstracts the above-described server, storage, networking resources from other service providers and partners for access and provisioning by the customer. As such, the customer provisioning interface coupled to the virtualization control system can permit the customer to configure, for example, on-demand digital and physical computing resources available from digital exchange 182.

In one embodiment, portal 133 is a web portal. Client device 137 provides a user interface that enables a customer/user to associate a specified network connection with a new computing environment. The new computing environment can be associated with a number of virtual machines that is specified in the user interface.

In one embodiment, a customer can use the user interface to create, provision, and manage its virtual resources across numerous virtual environments (which may physically span multiple physical data centers). For example, some virtual servers are physically located on hardware in a first physical data center, and other virtual servers are physically located in a second physical data center. In one example, the difference in physical location is irrelevant to the customer because the customer is presented an abstracted view of data center assets that span multiple virtualization control systems and multiple geographic locations.

In one embodiment, the above user interface enables a customer/user to add a network to a newly-created environment. The network is given a name and a VLAN identifier. The customer can create and place a new virtual server within the new environment. The customer can configure processing, memory, and storage resources to be associated with the new virtual server being created. The new server can then be deployed to the customer environment.

In one embodiment, the customer uses the user interface to perform configuration tasks for the new virtual server (e.g., providing a server name, selecting a number of processors to be associated with the virtual server, selecting an amount of system memory to be associated with the virtual server). The customer selects an operating system to associate with the new server.

In one embodiment, a customer can create groups of virtual servers. For example, customers can organize servers by function (e.g., a group of web servers, a group of SQL servers). The customer selects a particular virtual network (e.g., virtual network 121) to associate with the virtual server (e.g., a virtual machine running on server 107 or server 165), and then provides details of the IP address and DNS settings for the virtual server.

In one embodiment, after a customer purchases a block of IP addresses (e.g., associated with IP services 143), public IP addresses can be displayed in the user interface on client device 137. Another display screen can allow a user to examine assignments of private IPs to different virtual servers that have been configured.

In one embodiment, the user interface on client device 137 can be used to create an Internet service. The user selects a public IP address and a protocol. The user may then select a port value and a service name. A service description may be provided. A list of Internet services that have been provisioned for the IP address can be displayed in the interface. The provisioned services can include, for example, an FTP service, an SMTP service, etc. Within each service are listed the nodes (e.g., virtual servers) that have been created and associated with a particular Internet service, as well as the protocol and port.

In one example, switch configuration manager 127 can access the above customer environments (e.g., to add a network to a customer environment).

In one embodiment, the user interface on client device 137 can be used to provision network inter-connectivity between an existing VLAN of a customer at the data center with a remote public or private cloud network from a multitude of cloud service providers. The user interface on client device 137 can provide the user with an automated, on-demand process to add one or more off-premise cloud networks as a dynamic extension to a VLAN configured at network fabric 101 with improved efficiency, accuracy, as well as monitoring capability. In one example, the user interface on client device 137 can allow the user access to a federation of cloud service providers such that the connectivity to a remote cloud on-ramp is provided in a vendor agnostic manner.

In one example, the user interface on client device 137 includes a dashboard allowing the user to choose from network service providers, IT service providers, and cloud on-ramps to create one or more new network connections to a network existent at network fabric 101. In some implementations, such extension networks can include interconnection network services from digital cross connectivity provided by providers such as Megaport®, PacketFabric®, Zadara®, and the like. Further, the user interface at client device 137 presents to the user multiple choices of cloud networks provided by Amazon Web Services, Microsoft Azure, and the like, as well as remote networks hosted at another geographic location, which serves as a metro-to-metro extension to the network configured at network fabric 101. In one example, the user can utilize the user interface to provision a network port provided by a cross connecting network service provider (e.g., Megaport® service) to enable network connectivity between a first endpoint (e.g., the network configured at network fabric 101, VLAN configured at network fabric 101) and one or more second endpoints (e.g., remote networks, cloud service providers). In some embodiments, responsive to requests and data input via the user interface at client device 137, an underlying physical network fabric can be configured to provision network ports according to the user's specified network and request parameters. In one example, the user interface may be associated with a network of the user's, such as the user's VLAN configured at network fabric 101. Information associated with provisioned network ports and networks can be presented to include, for example, rate limit, location of the provisioning or network interconnect server, among other pertinent network configuration data. More details are described below with reference to FIGS. 3A-3B, and 4A-4C.

Figure 2:
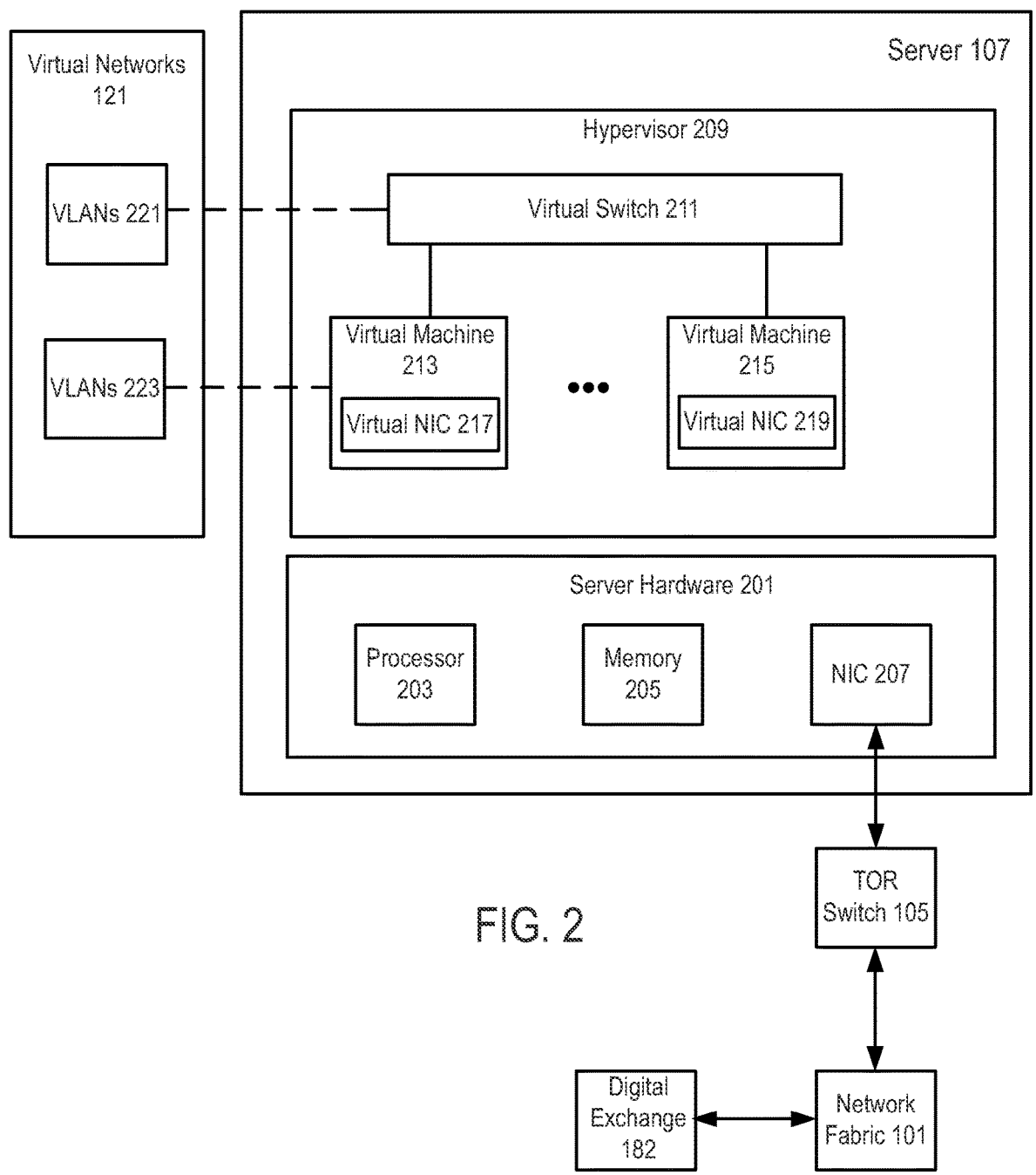
FIG. 2 shows an example server including server hardware executing a hypervisor that supports virtual machines, according to one embodiment.

FIG. 2 shows server 107 of FIG. 1, according to one embodiment. Server 107 includes server hardware 201 that executes a hypervisor 209. The hypervisor 209 supports virtual machines 213, 215. The server hardware 201 includes a processor 203, memory 205, and a network interface controller (NIC) 207. NIC 207 connects server 107 to a port of TOR switch 105. Another port of TOR switch 105 is connected to network fabric 101, which is connected to digital exchange 182.

Virtual machines 213, 215 generally communicate with network fabric 101 using TOR switch 105. Virtual machine 213 has a virtual NIC 217, and virtual machine 215 has a virtual NIC 219. In one embodiment, virtual NICs 217, 219 connect virtual machines 213, 215 to one or more virtual networks 121 of network fabric 101. In one example, virtual machine 213 is associated with VLANs 223 of network fabric 101.

For example, VLANs 223 may have been created by a customer of the data center that itself has installed server 107 in rack 103. In one example, the customer installs server 107 after switch configuration manager 127 has configured one or more ports of TOR switch 105 in response to one or more communications from client device 137. In one example, a locking mechanism on rack 103 does not permit entry by the customer until this configuration of TOR switch 105 has been completed by switch configuration manager 127.

Hypervisor 209 also supports a virtual switch 211. Virtual machines 213, 215 are connected to ports of virtual switch 211. In one example, virtual switch 211 also has one or more ports associated with VLANs 221 of network fabric 101.

In some embodiments, VLANs 221 and 223 of virtual networks 121 can be extended to include one or more remote cloud networks via digital exchange 182 and from cloud on-ramp 181. This way, not only is a customer enabled to dynamically provision and configure computing resources locally hosted at the data center, but also is enabled to dynamically expand its computing environment to leverage further computing resources available at a platform external or remote to the data center. Empowered with an automated, seamless way to connect to remote cloud infrastructure, a customer can achieve a computing environment hybrid of both local and on-demand resources in an efficient and effective manner.

Figure 3A:
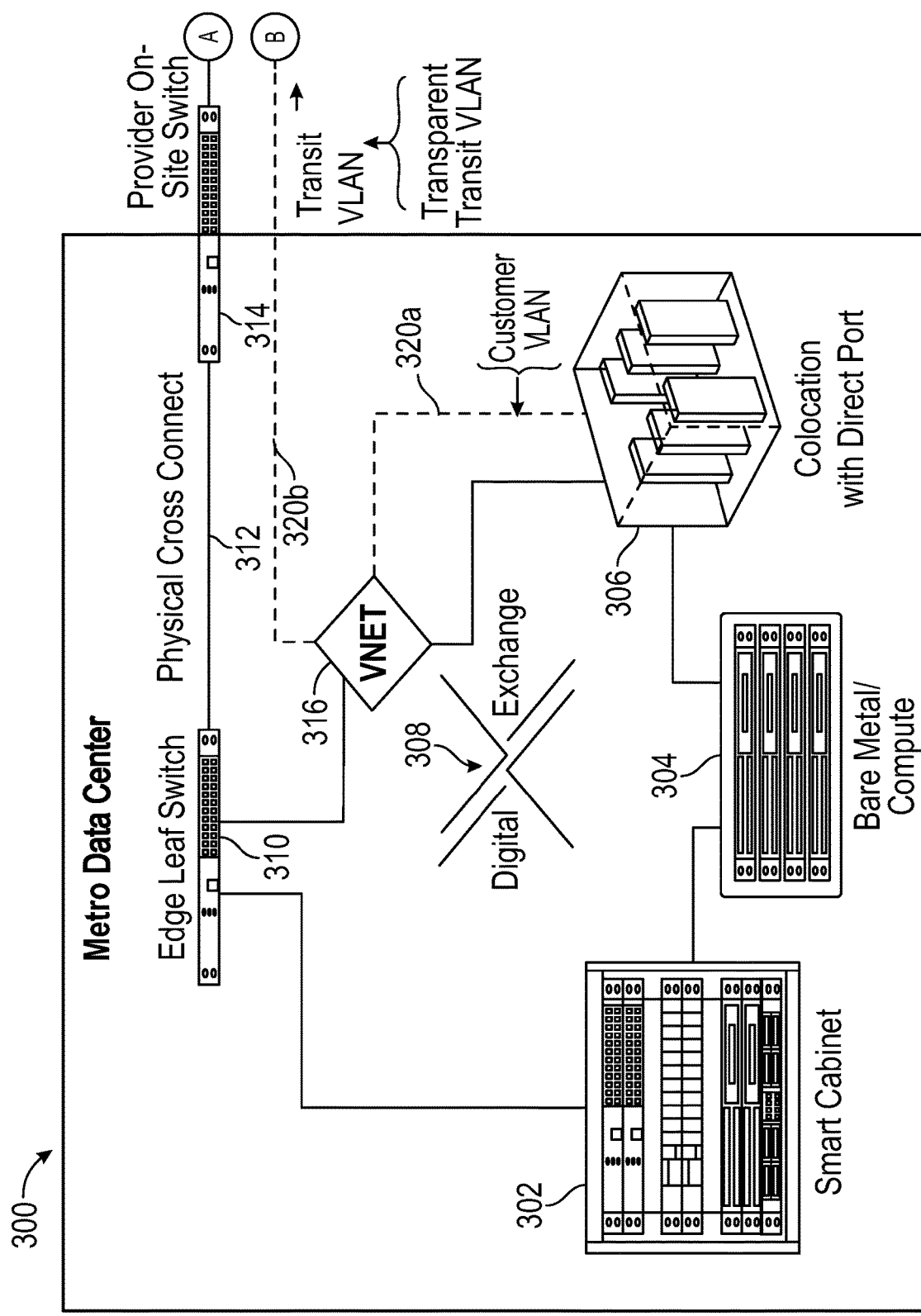
FIG. 3A shows portions of an example data center that includes a digital exchange for provisioning services and interconnecting networks, according to one embodiment.

FIG. 3A shows portions of an example data center 300 that includes a digital exchange 308 for provisioning services and interconnecting networks, according to one embodiment. As shown in FIG. 3A, metro data center 300 is configured with exemplary computing resources such as bare metal compute resource 304, artificial intelligence (AI) enabled smart cabinet 302, colocation infrastructure 306 (e.g., colocation compute environment with direct ports), as well as with digital exchange 308. In one example, smart cabinet 302, bare metal compute resource 304, and colocation infrastructure 306 are hosted locally at data center 300, which typically services customers located in the same metro area as data center 300 is located. In some embodiments, one or more of smart cabinet 302, bare metal compute resource 304, and colocation infrastructure can be implemented by rack 103, rack 155 and configured into communication via network fabric 101 illustrated above. In various embodiments, bare metal compute resource 304 can include hyper-converged infrastructure (HCI), CPU, GPU-based computing nodes, and the like. With digital exchange 308 interfacing and inter-operating with a multitude of service providers and partners, a customer of data center 300 can configure and extend a colocation computing environment on-premise of data center 300 to other services provided through digital exchange 308.

In one embodiment, colocation infrastructure 306 is configured with a virtual network VNet 316 including a VLAN 320a. In one example, VLAN 320a is configured by the customer of data center 300. VNet 316 can be implemented by, for example, one or more of virtual networks 121, 123 at network fabric 101; and VLAN 320a can be implemented by one or more of VLANs 221, and 223, and the like.

In some embodiments, digital exchange 308 can be included as part of network fabric 101 or configured in communication with network fabric 101. This way, separately or additionally from the above-described configuration of locally hosted computing resources, the customer of data center 300 can be provided with dynamic networking and service provisioning from providers and partners external to the data center 300.

In one embodiment, when network fabric of data center 300 is a leaf-spine data center switching fabric, digital exchange 308 can be configured in communication with network switches of data center 300. For example, digital exchange 308 can be configured in communication with an edge left switch 310.

In one embodiment, edge leaf switch 310 is connected to a provider on-site switch 314. In one example, on-site switch 314 is a physical network switch dedicated for communication to a service provider interfacing digital exchange 308. In one embodiment, the connectivity between edge leaf switch 310 and on-site switch 314 is managed by data center 300 such that the connectivity can be configured as a cross connect 312. In one embodiment, a digital exchange port can be provided at edge leaf switch 310 for accepting incoming requests to extend a VLAN. In one example, the digital exchange port can be allocated in dedication for each pair of a service provider (e.g., intermediary cross connect provider) and a destination cloud network. In one embodiment, the dedicated digital exchange port can be bound to a system BAN. In some embodiments, the exchange port can be configured as a private port without the ability to connect to the other services (e.g., IP connection services).

Figure 3B:
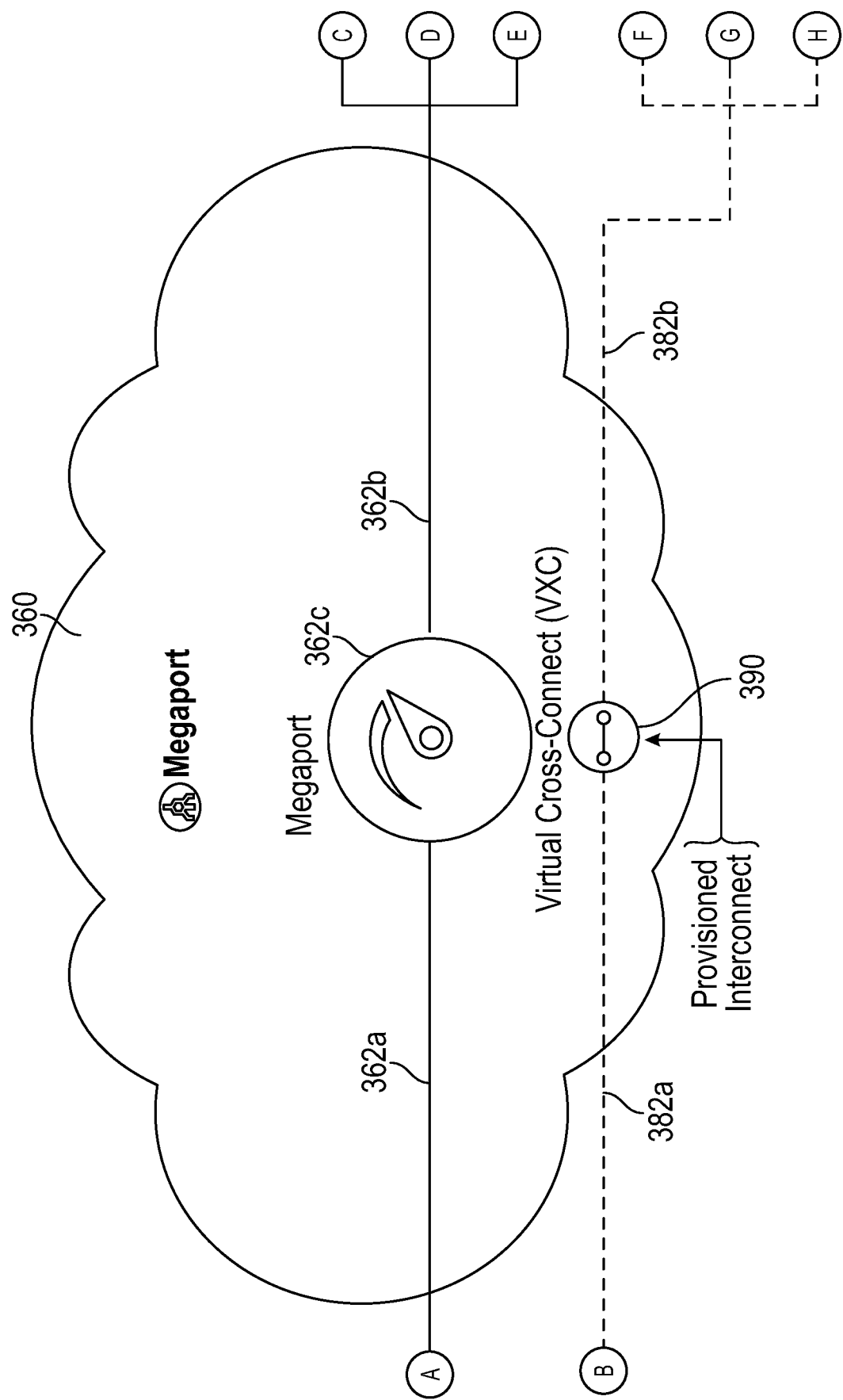
FIG. 3B shows an example interconnecting network that provides connectivity between the data center of FIG. 3A and a destination cloud platform, according to one embodiment.

FIG. 3B shows an example interconnecting network 360 that provides connectivity between data center 300 and a destination cloud platform, according to one embodiment. For the purpose of illustration, features and functionality associated with Megaport® network is used to illustrate exemplary interconnecting network 360 according to some embodiments of the present disclosure. However, it should be understood that any suitable networks and platforms capable of creating, interconnecting, and managing network connections can be used to provision cloud extension to a virtual network hosted at data center 300. By way of non-limiting example, networks provided by vendors such as Zayo, PacketFabric, and the like can be applicable herein as exemplary interconnecting network 360, not limited by the examples herein.

In one embodiment, interconnecting network 360 provides software based interconnectivity between network endpoints and therefore serves as an intermediary cross connect network between a source network and a destination network. In one embodiment, interconnecting network 360 provides network connectivity via a wide area network (WAN). In one example, responsive to a request to extend VLAN 320a to a cloud network remote from data center 300, digital exchange 308 can request a network port from interconnecting network 360. In another example, digital exchange 308 can establish a network port at interconnecting network 360 proactively. For example, data center 300 can request one or more network ports at interconnecting network 360 independent of any request from customers to provision remote cloud extension. In this scenario, the provider of interconnecting network 360 can install on-site switch 314 at data center 300 to proactively establish data center 300 as a cross connect enabled (e.g., Megaport® enabled) data center. As a result, underlying physical network connectivity from on-site switch 314 to interconnecting network 360 is established via physical cross connect 362a onto network port 362c at interconnecting network 360. In one embodiment, data center 300 can pre-establish multiple data-center network ports associated with a collection of respective geographical locations serviced by interconnecting network 360 (e.g., geographically disbursed data center of interconnecting network providers). This way, depending on the choice of the remote cloud network specified by the customer, digital exchange 308 can match extension criteria (e.g., geographic location, interface speed preference diversity zone preference, aggregation control) specified in the remote cloud connectivity request of the customer to the description or metadata associated with the network port supported at interconnecting network 360. In one example, the customer of data center 300 can utilize an aggregation control mechanism to configure multiple physical ports at interconnecting network 360 as a single logical interface in communication with on-site switch 314 and a plurality of network ports at interconnecting network 360.

Figure 4A:
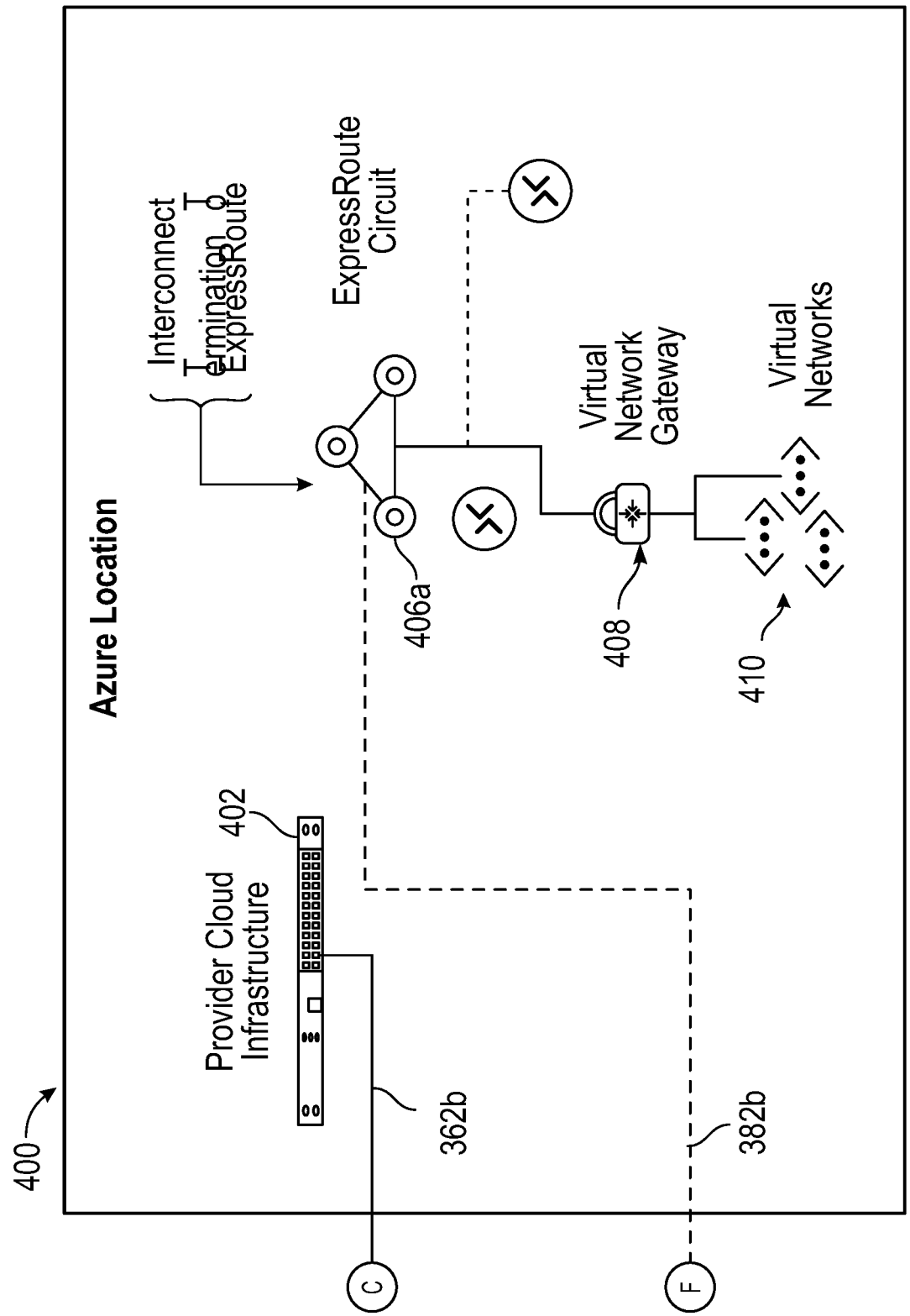
FIGS. 4A-4C show portions of example destination cloud platforms connected to the interconnecting network of FIG. 3B as respective extensions of a network configured at the data center of FIG. 3A, according to one embodiment.
Figure 4B:
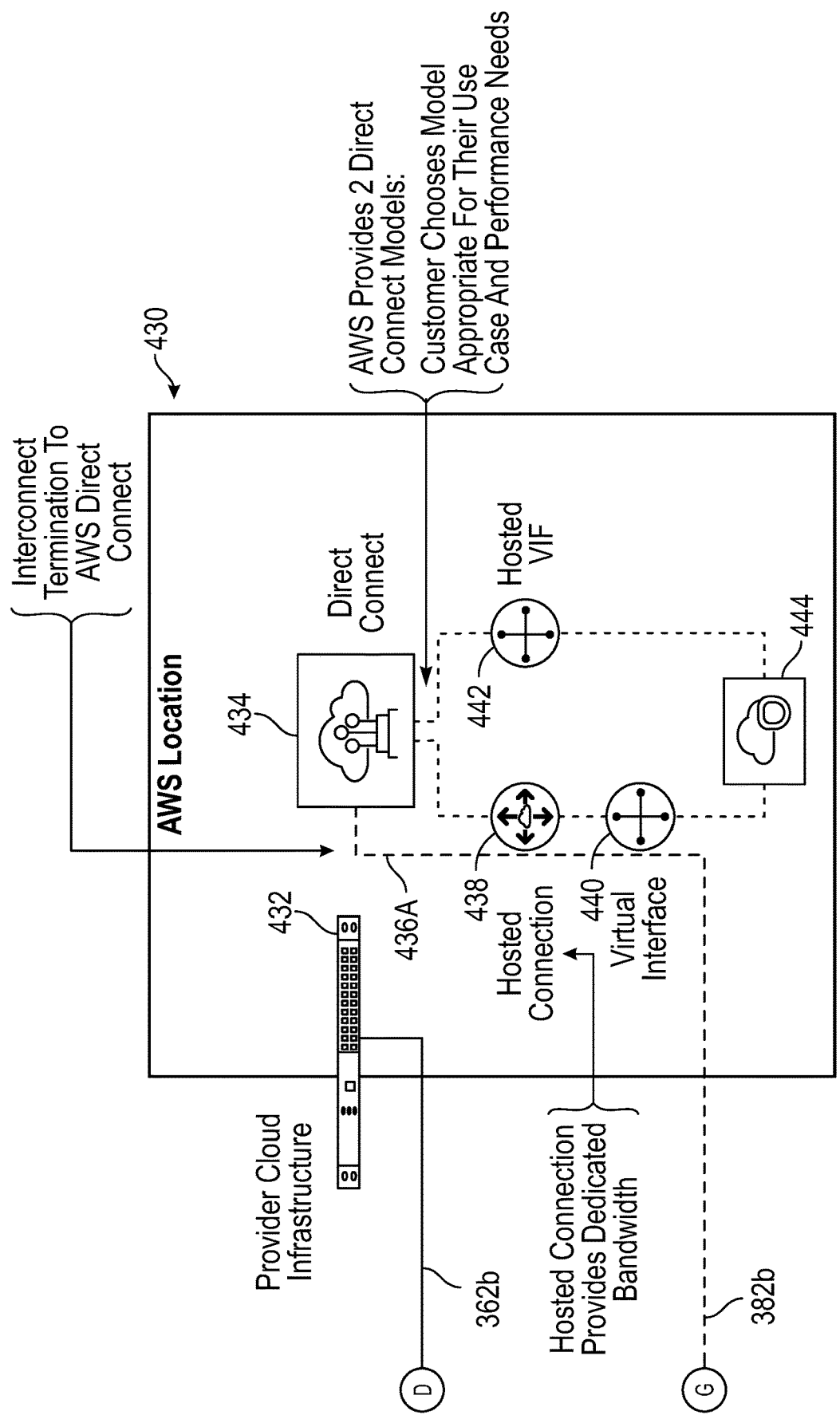
Figure 4C:
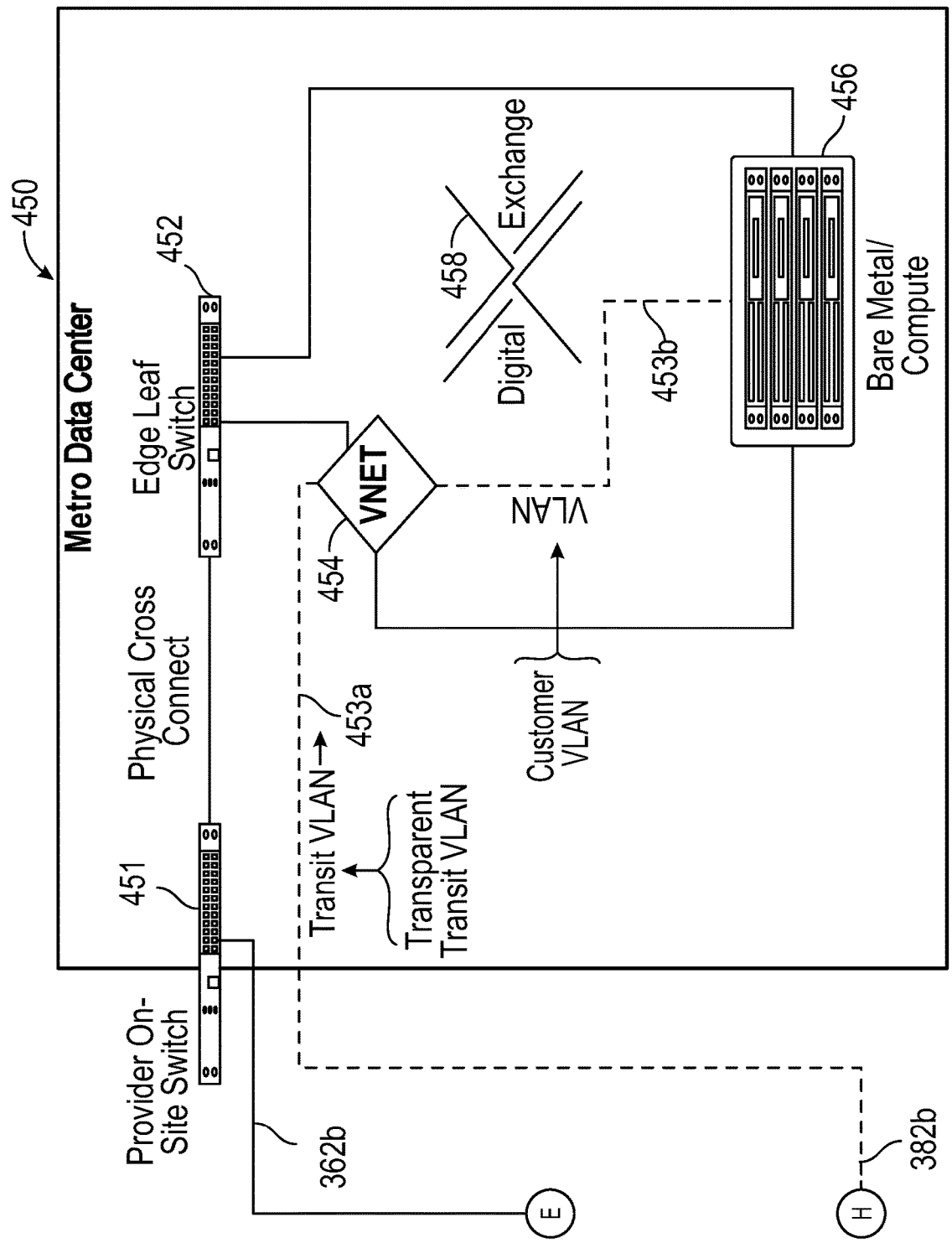

In one embodiment, network port 362c can comprise a network interface for a dedicated connection between a first endpoint at data center 300 and a second endpoint at interconnecting network 360. As shown in the illustrative example of FIG. 3B, network port 362c can be further connected via a physical network connection 362b to a network endpoint external to interconnecting network 360. For example, physical network connection 362b can be connected to a remote network endpoint associated with a destination cloud network as illustrated in FIGS. 4A-4C or one or more additional intermediary interconnecting networks (not shown).

In one embodiment, and as shown in this illustrative example, a virtual network connection 382a can be configured to overlay physical network connection 362a to establish a virtual link between data center 300 and interconnecting network 360. In one example, in response to the above described cloud connection request from the customer of data center 300, a virtual cross connect 390 can be dynamically provisioned at interconnecting network 360 to further connect virtual network connection 382a onto a virtual network connection 382b, which is configured to establish a virtual network connection onto a remote network external to interconnecting network 360. In one example, virtual network connection 382b is configured to overlay physical network connection 362b such that to establish a respective virtual network connection onto the cloud platforms illustrated in FIGS. 4A-4C, below.

In one embodiment, virtual cross connect 390 can include a private point-to-point network connection (e.g., Ethernet connection) between network port 362c and one of the afore-described network endpoints. Exemplary remote network endpoints can be associated with, but not limited to, a network interface of interconnecting network 360, a platform of a cloud service provider, a platform of another data center, a platform of other service providers inter-operable with interconnecting network 360, or some combination thereof.

In the examples illustrated in FIGS. 3A-3B, and 4A-4C, the customer of data center 300 can provision an extension to VLAN 320a first with transit VLAN 320b (connecting edge leaf switch 310 and on-site switch 314), then with VLAN 382a connecting data center 300 and interconnecting network 360, and then VLAN 382b connecting interconnecting network 360 onto a respective remote network. In one example, network port 362c can be configured as an IEEE 802.1Q VLAN trunk to support a multitude of virtual cross connects, each of which is associated with an individual VLAN or virtual circuits overlaying thereon.

FIGS. 4A-4C show portions of example destination cloud platforms connected to interconnecting network 360 of FIG. 3B as a respective extension of a network configured at data center 300 of FIG. 3A, according to one embodiment.

FIG. 4A shows an example extension onto an Azure cloud network from VLAN 320a hosted at data center 300, according to one embodiment. In this example, an exemplary Azure cloud network 400 is configured with an ExpressRoute circuit 406a that includes a virtual network gateway 408 further connecting to a plurality of virtual networks 410.

In one embodiment, physical network connection 362b is configured in communication with a provider cloud infrastructure 402 provisioned in association with Azure cloud network 400. As such, virtual network connection 382b is configured via virtual cross connect 390 onto a network endpoint associated with Azure ExpressRoute Circuit 406a. In this illustrated example, virtual interconnect provisioned to extend VLAN 320a is terminated at ExpressRoute 406a. Given the establishment of virtual inter-connection between VLAN 320a and ExpressRoute 406a, computing infrastructure such as various virtual networks 410 provided at remote Azure cloud network 400 can be included as a remote extension to the on-premise computing infrastructure serviced at data center 300.

In one embodiment, when connected to Azure cloud network 400, virtual cross connect 390 is configured to establish physical network connectivity at Layer 2. In this case, Layer 3 functionality such as controls under Broder Gateway Protocol (BGP) is configured directly between LVAN 320a and Azure cloud network 400. As a result, VLAN 320a at data center 300 is extended or stretched through interconnecting network 360 onto or terminating at ExpressRoute circuit 406 hosted at Azure cloud network 400.

ExpressRoute 406 typically can be configured to provide two peering interfaces: Azure private and Microsoft public peering. Azure private peering interface can be established instantly without any validation process. On the other hand, Microsoft public peering interface requires additional validation for the usage of resources such as IP space, or requires additional user information, etc. In one example, both interfaces can be provided via virtual cross connect 390 by implementing protocols such as IEEE 802.1ad protocol, which double tags the data traffic incoming from data center 300 (e.g., customer-tag and provider-tag). Although only one VLAN 320a on one VNet 316 is shown as the source network extended with ExpressRoute circuit 406, multiple VLANs on multiple virtual networks at data center 300 or multiple VLANs at multiple virtual networks hosted at multiple other data centers can be configured with the above-described cloud extension onto a single (or multiple) ExpressRoute circuit 406, not limited by examples illustrated herein.

FIG. 4B shows an example extension onto an Amazon AWS cloud network from VLAN 320a configured at data center 300, according to one embodiment. In this illustrated example, AWS cloud network 430 is configured to interoperate with external computing infrastructure via a network gateway service (e.g., Direct Connect 434). Once in communication with Direct Connect 434, AWS cloud network 430 can provide at least two models of connections to a remote customer: hosted virtual interfaces (hosted VIFs) 442, and hosted connections 438.

In one embodiment, physical network connection 362b is configured in communication with a provider cloud infrastructure 432 provisioned in association with AWS cloud network 430. As such, virtual connection 382b is configured via virtual cross connect 390 onto a network endpoint associated with Direct Connect 434. In this illustrated example, virtual interconnect provisioned to extend VLAN 320a is terminated at Direct Connect 434. Given the establishment of virtual inter-connection between VLAN 320a and Direct Connect 434, computing infrastructure such as hosted connections 438 (and its associated virtual interfaces 440), as well as hosted VIFs 442 provided at remote AWS cloud network 430 can be included as a remote extension to the on-premise computing infrastructure serviced at data center 300.

In one embodiment, the customer who requests to extend VLAN 320a to include the computing resources hosted at AWS cloud network 430 is enabled to specify which AWS Direct Connection model described above is to be used to provision such cloud extension. In one example, the customer can specify criteria such as the conditions associated with performance requirements, budget constraints, and so on. For example, when the customer is interested in extending VLAN 320 with dedicated bandwidth in the remote cloud network, Hosted Connections 438 may be provisioned to implement the extension to VLAN 320a. In one example, depending on the network speed configured via AWS cloud network 430, Hosted Connections 438 can be configured to provide a variety of virtual interfaces 440. For example, virtual interfaces 440 may include a private virtual interface, a public virtual interface, and/or a transit virtual interface.

In one embodiment, when the customer selects to extend VLAN 320a via hosted VIFs 442, the cloud extension can be implemented to connect to both public and private AWS cloud services through their respective public and private virtual interfaces supported at Hosted VIF 442. In one example, the customer is enabled with options to manage the bandwidth provisioned at each virtual interface, which can share the bandwidth configured for the connection between virtual cross connect 390 and Hosted VIF 442. In one example, the customer can monitor the bandwidth usage incurred by each of the public or private virtual interfaces so that to dynamically adjust to ensure desired network/service performance. In another example, the customer is enabled to change the service speed without the need to re-provision or re-deploy workloads at AWS cloud network 430.

FIG. 4C shows an example extension onto a cloud network 450 hosted at another data center from VLAN 320*a* hosted at data center 300, according to one embodiment. In this illustrative example, the remote data center is geographically remote from data center 300 and configured to service customers in its own geographical area in general. The remote data center may be provided by the same data center service provider that services data center 300, a data center service provider different than the service provider servicing data center 300, or some combination thereof. In one example, similar to data center 300 described above, cloud network 450 is configured with computing resources such as bare metal compute resource 456 and a digital exchange 458. In one embodiment, a customer of the remote data center can configure various computing infrastructure such as a virtual network VNet 454 to include a VLAN 465.

In one embodiment, physical network connection 362*b* is configured in communication with a provider on-site switch 451 provisioned in association with cloud network 450. Provider on-site switch 451 can be configured to further connect onto a network endpoint associated with the data center providing cloud network 450. In one example, provider on-site switch 451 is connected to an edge leaf network switch 452 such that the physical connection between those two endpoints can be managed as a physical cross connect by the remote data center. Also, similar to edge leaf network switch 310 described with reference to FIG. 3A, edge leaf network switch 452 can be configured in communication with VNet 454, and a transit VLAN 453*a* is configured to overlay the physical cross connect between on-site network switch 451 and edge leaf network switch 452. As such, virtual network connection 382*b* is configured to overlay physical network connection 362*b* onto a network endpoint associated with on-site network switch 451. In this example, transit VLAN 453*a* is shown to further extend virtual network connection 382*b* onto VNet 454 and digital exchange 458. As a result, VLAN 453*b* and its associated computing resources hosted and configured at the remote data center is configured, via virtual network connection 382*b* and transit VLAN 453*a*, as a remote cloud extension to VLAN 320*a* hosted at data center 300.

FIGS. 5A-5D show portions of example graphic user interfaces (GUIs) for provisioning services and interconnecting networks hosted at a data center in extension onto destination platforms, according to one embodiment. Here, the example GUIs can be operated by a user of the data center 300 of FIG. 3A to configure extensions of a virtual network hosted thereat to the example destination platforms such as the Azure cloud network 400, AWS cloud network 430, cloud network 450 hosted at another data center of FIGS. 4A-4C. In the embodiment illustrated herein, the data center and the destination platforms can be interconnected by the example interconnecting network 360 of FIG. 3B (e.g., Megaport® network). In some implementations, prior to displaying the GUIs of FIGS. 5A-5C, a graphic user interface of the data center (e.g., a portal of the data center) can be configured to present to the user operable options that allow the user to select an interconnecting network from a multitude of cross connect providers that are in partnership with the data center (e.g., PacketFabric®, Zadara®, and the like).

FIG. 5A shows portions of an example GUI for provisioning and interconnecting networks at the data center with an Azure cloud network as the destination platform. As shown herein, the user is presented with three options to configure an extension of a virtual network at the data center onto the Azure cloud network. The first option of the GUI allows the user to specify an Azure cloud network as the destination platform (or, in another example, this option can be pre-populated given the user's selection at another GUI of the portal prior to the user navigating to the GUI herein). The second option of the GUI allows the user to select a virtual network hosted at the data center. Here, the user can enter a name for the connection under provisioning onto the Azure cloud network (e.g., "Azure onramp" as shown here as an example). The user is also provided with two options in terms of selecting the virtual network at the data center for extension to the Azure cloud network. The user can either select an existing virtual network at the data center or choose to create a new virtual network at the data center. Here in this example, the user has selected the "Select Existing" option and specified an existing virtual network "Cloud (301)" as the source network at the data center for extending. In other examples not shown here, when the user selects the "Select Existing" option, the GUI can populate the drop down list of "Virtual Network" with the virtual networks the user has already configured or otherwise established at, e.g., a network fabric at the data center.

Also in other examples not shown here, when the user selects the "Creating New" option, the GUI can present suitable options for the user to create a new virtual network at the network fabric at the data center. The third option of the GUI allows the user to configure the extension connection at the Azure cloud network. In one example, the third option can prompt the user to enter the credentials for log into a Microsoft Azure account in order to provision the networks (e.g., ExpressRoute circuits) into connection with the virtual network selected via the second option. Alternatively, the third option can prompt the user to enter information pertaining to the Azure cloud network directly, without requiring the user to log into the Microsoft Azure account. In this example, the destination Azure cloud network is identified by the information entered into the "ExpressRoute Service Key" text field, the information selected from the "Availability Zone (ExpressRoute Port)" list, and the information entered into the "Provider" text field. Once done with provisioning via the three options, the GUI provides the user with an "Order Summary" section, in which the information regarding the provisioned cloud on-ramp is displayed to the user (e.g., the account information, the metro location information, the quantity of extension connection, and monthly charge fee information). Also, via the order summary section, the GUI provides the user a checkout button to order the configured extension onto the Azure cloud network, as well as an order summary download button to store an offline copy of the order summary.

Figure 5B:
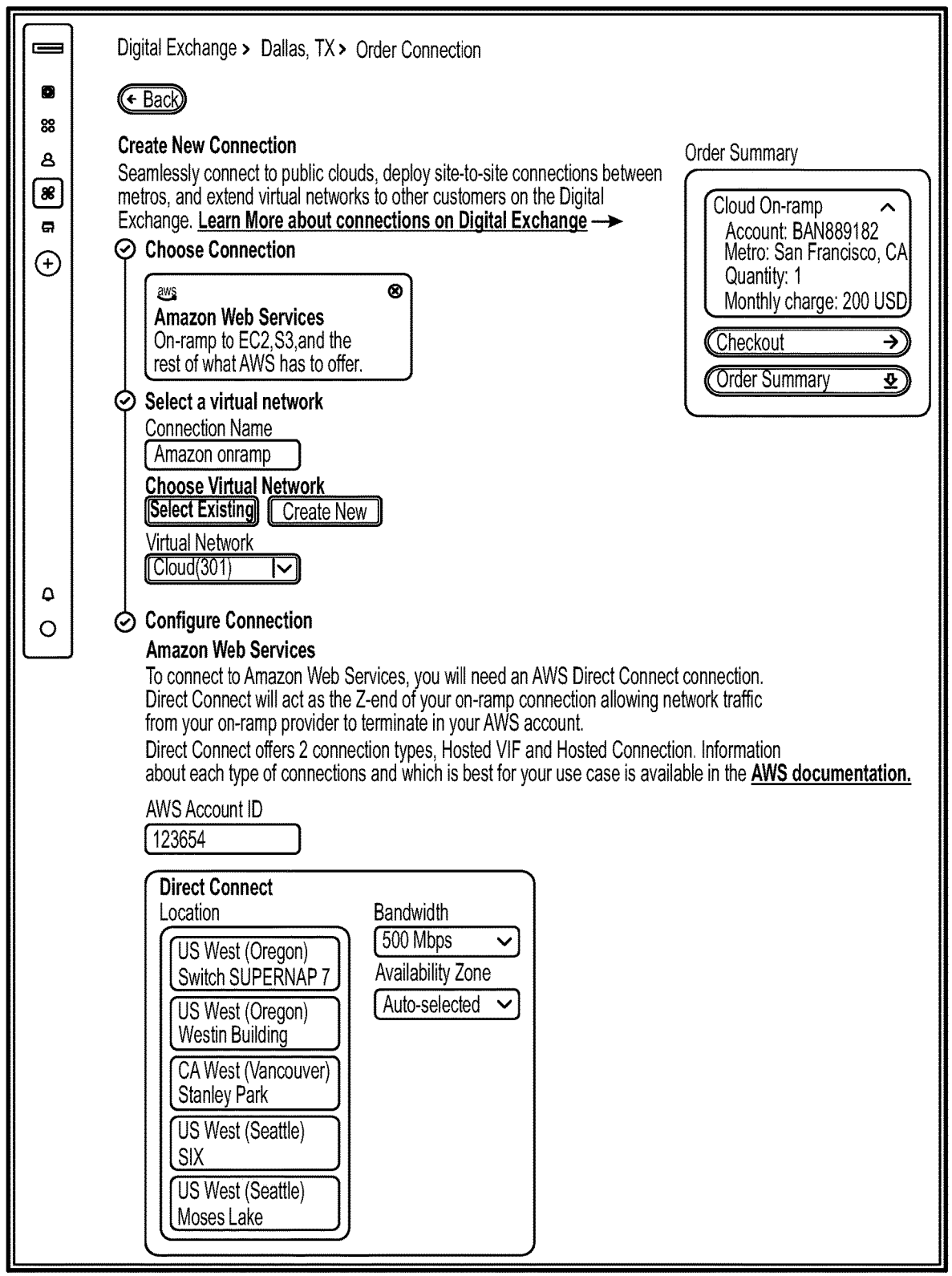

FIG. 5B shows portions of an example GUI for provisioning and interconnecting networks at the data center with an AWS cloud network as the destination platform. As shown herein, the user is presented with three options to configure an extension of a virtual network at the data center onto the AWS cloud network. The first option of the GUI allows the user to specify an AWS cloud network as the destination platform (or, in another example, this option can be pre-populated given the user's selection at another GUI of the portal prior to the user navigating to the GUI herein). The second option of the GUI allows the user to select a virtual network hosted at the data center. Here, the user can enter a name for the connection under provisioning onto the AWS cloud network (e.g., "Amazon onramp" as shown here as an example). The user is also provided with two options in terms of selecting the virtual network at the data center for extension to the AWS cloud network. The user can either select an existing virtual network at the data center or choose to create a new virtual network at the data center. Here in this example, the user has selected the "Select Existing" option and specified an existing virtual network "Cloud (301)" as the source network at the data center for extending. In other examples not shown here, when the user selects the "Select Existing" option, the GUI can populate the drop down list of "Virtual Network" with the virtual networks the user has already configured or otherwise established at, e.g., a network fabric at the data center.

Also in other examples not shown here, when the user selects the "Creating New" option, the GUI can present suitable options for the user to create a new virtual network at the network fabric at the data center. The third option of the GUI allows the user to configure the extension connection at the AWS cloud network. In one example, the third option can prompt the user for access to an AWS Direct Connect service (e.g., by entering the credentials for log into an AWS account) in order to provision the networks (e.g., Hosted VIFs and/or Hosted Connections) into connection with the virtual network selected via the second option. In this example, the destination AWS cloud network is identified by the information entered into the "AWS Account ID" text field, and the information selected from the "Direct Connect" panel which allows the user to select from the "Location" list to specify a particular region hosting the Direct Connect service, as well as other parameters such a desired bandwidth from the "Bandwidth" dropdown list, and the availability zone information selected via the "Availability Zone" dropdown list. Here, in this example, the availability zone is specified as an auto-selected one instead of a particular zone. Once done with provisioning via the three options, the GUI provides the user with an "Order Summary" section, in which the information regarding the provisioned cloud on-ramp is displayed to the user (e.g., the account information, the metro location information, the quantity of extension connection, and monthly charge fee information). Also, via the order summary section, the GUI provides the user a checkout button to order the configured extension onto the Azure cloud network, as well as an order summary download button to store an offline copy of the order summary.

Figure 5C:
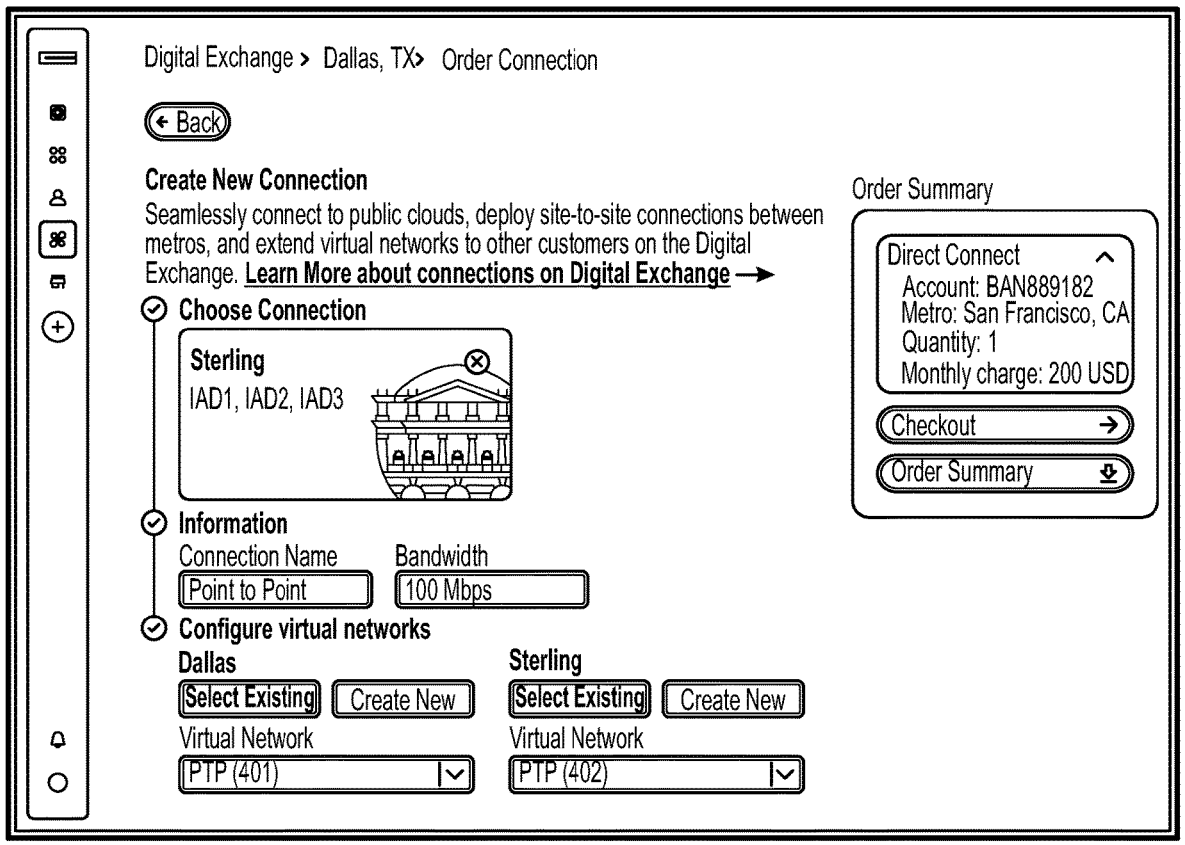

FIG. 5C shows portions of an example GUI for provisioning and interconnecting networks at the data center with a cloud network hosted at another data center (e.g., Sterling) as the destination platform. As shown herein, the user is presented with three options to configure an extension of a virtual network at the data center onto the Sterling cloud network. The first option of the GUI allows the user to specify a remote data center as the destination platform (or, in another example, this option can be pre-populated given the user's selection at another GUI of the portal prior to the user navigating to the GUI herein). The second option of the GUI allows the user to provide information about the connection between the two data centers. Here, the user can enter a name for the connection under provisioning onto the Sterling cloud network (e.g., "point to point" as shown here as an example). The GUI also allows the user to select a desired bandwidth for the connection via the "Bandwidth" dropdown list. The third option of the GUI allows the user to configure the virtual networks at both data centers. Here, the user is also provided with two options in terms of configuring the virtual networks. For each data center, the user can either select an existing virtual network at the data center or choose to create a new virtual network at the data center. Here in this example, the user has selected the "Select Existing" option and specified an existing virtual network "PTP (401)" as the source network at the Dallas data center, and an existing virtual network "PTP (402)" as the destination network at the Sterling data center.

In other examples not shown here, when the user selects the "Creating New" option, the GUI can present suitable options for the user to create a new virtual network at the network fabric at either or both data centers. Once done with provisioning via the three options, the GUI provides the user with an "Order Summary" section, in which the information regarding the provisioned cloud on-ramp is displayed to the user (e.g., the account information, the metro location information, the quantity of extension connection, and monthly charge fee information). Also, via the order summary section, the GUI provides the user a checkout button to order the configured extension onto the Azure cloud network, as well as an order summary download button to store an offline copy of the order summary.

Figure 5D:
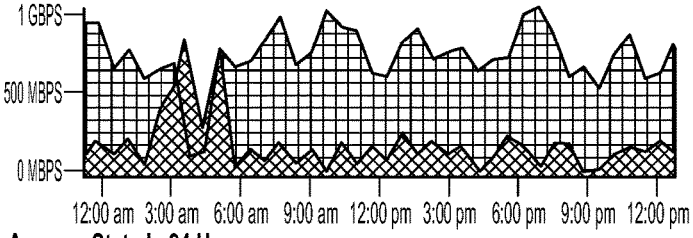

FIG. 5D shows portions of an example GUI for displaying, monitoring, and adjusting the provisioning and interconnection of networks at the data center and a cloud network hosted at the destination platform, according to one embodiment. In this example, the GUI allows the user to manage the extension network connecting the virtual network at the data center with the AWS cloud network as described with above with reference to FIG. 5B.

At this example GUI, an AWS cloud has already been provisioned and connected to the virtual network hosted at the data center. Here, the GUI can be configured to display various data pertaining to the extension network connection to include, for example but not limited to, descriptive information about the extension connection (e.g., cloud on ramp), traffic information incurred at the extension connection, event log for the extension connection, as well as the information related to the provider, the user account, additional details, and so on.

Here, the GUI allows the user to delete the extension cloud in display, modify the extension connection, save the modification or discard the modification. As to the traffic information, in this example, the GUI is configured to display statistics on the extension connection, for example during the last 24 hours to show both an outbound and an inbound traffic amount incurred along a timeline. Here, statistics such as averaged performance can also be computed and displayed for the last 24 hours. In one example, based on the data on the traffic status on the extension connection, the data center can automatically adjust the provisioning of the extension connection, or automatically add additional extension connection(s) or delete existing extension connection(s).

Figure 6:
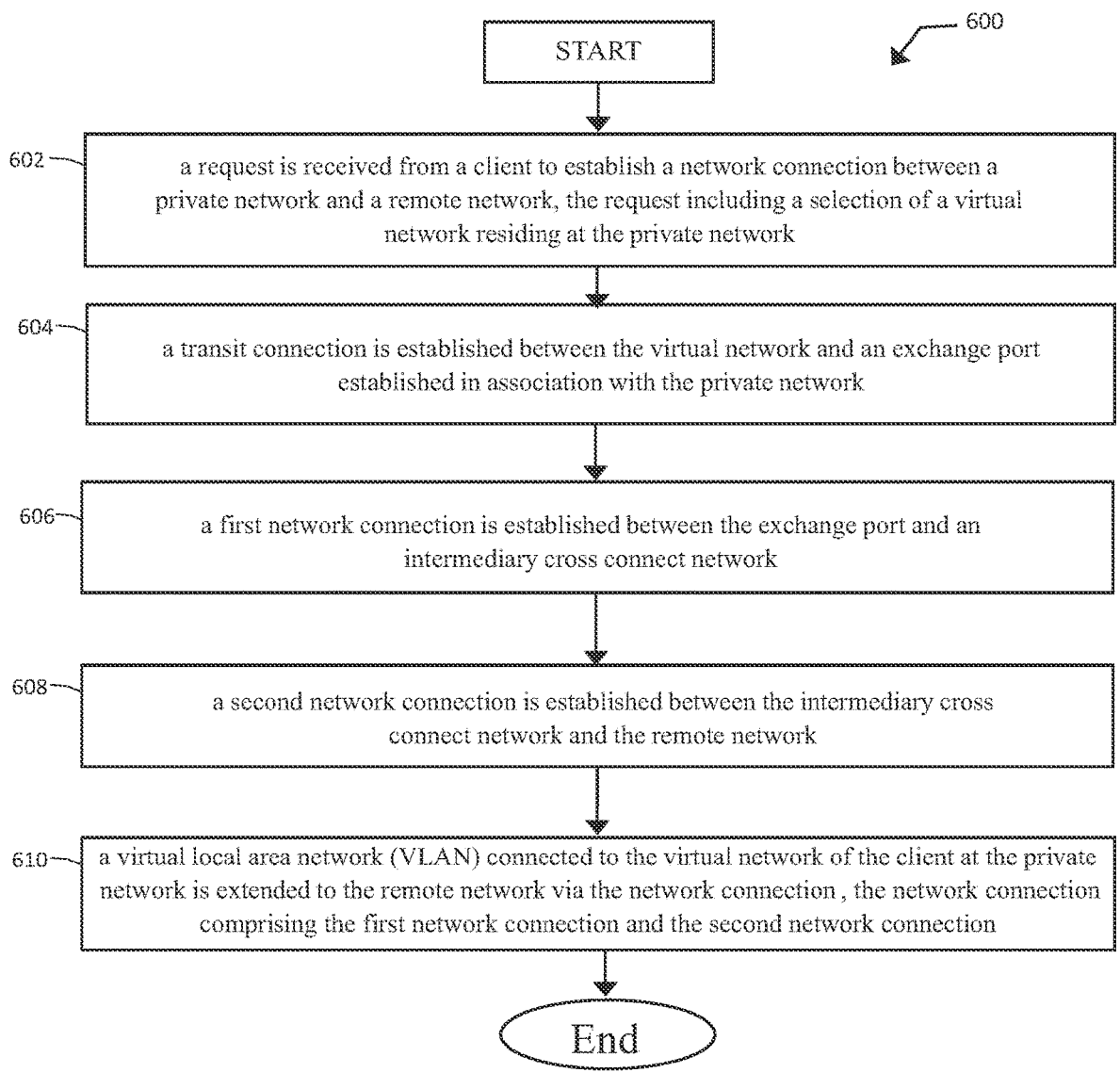
FIG. 6 shows a method for extending a network configured at a data center to a remote cloud network, according to one embodiment.

FIG. 6 shows a method 600 for extending a network (e.g., VLAN 320*a*) configured at a network fabric of a data center (e.g., data center 300) to a remote cloud network (e.g., Azure cloud network 400, AWS cloud network 430, or cloud network 450 hosted by a data center at a remote metro location), according to one embodiment. For example, the method 600 of FIG. 6 can be implemented by the systems of FIGS. 1, 2, 3A-3B, and 4A-4C.

The method 600 of FIG. 6 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method 600 of FIG. 6 is performed at least in part by one or more processors of computing device 125 of FIG. 1. In one embodiment, computing device 125 is implemented using the processors and memory of FIG. 7 or 7 (see below).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 602, a request is received from a client to establish a network connection between a private network and a remote network, the request including a selection of a virtual network residing at the private network. In one example, the client includes client device 137 of FIG. 1, and the private network includes networks configured in network fabric 101 implemented at the data center of FIG. 1, or VNet 316 implemented at data center 300 of FIG. 3A.

In one embodiment, a customer of a data center can utilize the client to configure a plurality of virtual networks such as VLANs 221, 223 in virtual networks 121 of FIG. 2, or a plurality of VLANs 320*a* in connection with VNet 316 of FIG. 3A. Therefore, to extend a particular virtual network (e.g., a VLAN) hosted locally at the data center (e.g., on-premise virtual network) with a cloud network hosted at the remote network, the customer can include an identifier indicating a selection of the particular virtual network. For example, the selected virtual network can be identified with a VLAN ID associated with virtual networks 121, 123. In one example, the remote network includes an interconnecting network 360 of FIG. 3B.

In one embodiment, the customer can also provide information related to provisioning a remote cloud network as an extension to the selected virtual network. For example, the customer can utilize the client to provide information related to the choice of the remote network (e.g., Azure cloud infrastructure, AWS cloud infrastructure, a cloud network hosted at another data center), among other information.

At block 604, a transit connection is established between the virtual network and an exchange port established in association with the private network. In one embodiment, the exchange port can be provided as part of the connectivity fabric at digital exchange 308 of FIG. 3A. In one example, the exchange port can be proactively configured into connection with respective external networks in anticipation of customers' requests such as the request received at block 602. In another embodiment, additionally or separately, the exchange port can be configured in response to customers' requests such as the request received at block 602. In one embodiment, the exchange port can be implemented at an edge leaf network switch associated with digital exchange 308. In other embodiments, the exchange port can be implemented at any suitable network components capable of establishing a network connection with respective networks external to the data center servicing the customer's request.

At block 606, a first network connection is established between the exchange port and an intermediary cross connect network. In one embodiment, the intermediary cross connect network can include one or more interconnecting networks such as interconnecting network 360 of FIG. 3B. In one embodiment, the service provider of the intermediary cross connect network can configure an on-site network switch (e.g., on-site switch 314) dedicated to overlaying the traffic to and from the intermediary cross connect network. In this scenario, the first network connection can be established between the exchange port and the intermediary cross connect network via such an on-site network switch. In other embodiments, various networking techniques can be applied to inter-connecting the exchange port with or without dedicated connectivity onto the intermediary cross connect network, not limited by the examples illustrated herein.

In one embodiment, the first network connection between the exchange port and the intermediary cross connect network can be proactively established in anticipation of customers' requests such as the request received at block 602. Given the established first network connection between the exchange port and an intermediary cross connect network, the transit connection between the virtual network and the exchange port can be extended to overlay such network connection onto the intermediary cross connect network. In one embodiment, the above described request can further include information related to the intermediary cross connect network. For example, the customer can utilize the client to provide information related to the choice of the intermediary cross connect network (e.g., Megaport®, PacketFabric®, Zayo®), among other information.

In one embodiment, the customer can utilize the client to specify only the information related to the remote network. In this scenario, the customer delegates the selection of the intermediary cross connect to digital exchange 308 of the data center. For example, the customer can specify the information that facilitates digital exchange 308 to select the intermediary cross connect network in terms of factors such as, but not limited to, bandwidth, costs, geographic locations, and other factors associated or desired for executing the customer's workloads in an extended computing infrastructure hybrid of the virtual network and the remote network.

In one embodiment, instead of providing the information related to the remote network or the intermediary cross connect network, the customer can utilize the client to specify only the computing resources expected or desired in extending the local virtual network to include the remote network. In this scenario, one or both of the selection for the remote network and the intermediary cross connect network can be delegated to digital exchange of the data center. In one example, given a cost constraint entered by the customer at the client for extending a virtual network, digital exchange can be configured to select a pair of intermediary cross connect network and the remote network offering compatible pricing structures. As illustrated in the examples, not only can digital exchange be configured as network (e.g., intermediary cross connect network and destination network) provider agnostic, but also be configured to automate the customer's virtual network extension request according to high level network performance requirements, without the need to obtain specific details regarding how to build an extension over remote networks.

At block 608, a second network connection is established between the intermediary cross connect network and the remote network. In one embodiment, the service provider of the intermediary cross connect network can configure a dedicated on-site connection network component at the remote network for connectivity. Such on-site connection network component can include, for example but not limited to, the intermediary cross connect network provider's on-site cloud infrastructure 402, 432, the intermediary cross connect network provider's on-site network switch 451, and the like. In this scenario, the duo of the dedicated digital exchange port at data center 300 and the afore-described dedicated network components can be stored as dedicated configuration for the respective network extension. In one example, the second network connection between the intermediary cross connect network and the remote network can be established via such on-site provider specific infrastructure or network switch. In other embodiments, various networking techniques can be applied to inter-connecting the intermediary cross connect network with or without dedicated connectivity onto the remote network, not limited by the examples illustrated herein.

At block 610, a virtual local area network (VLAN) connected to the virtual network of the client at the private network is extended to the remote network via the network connection, the network connection comprising the first network connection and the second network connection. Given the established second network connection between the intermediary cross connect network and the remote network, the transit connection extended onto the intermediary cross connect network is further extended to the remote network in overlay of the second network connection. As a result, the virtual network connected to the transit connection is extended across the intermediary cross connect network to include the remote network.

In one embodiment, one or more deployment algorithms can be configured for the network connection. In one example, such configuration can be responsive to a request via an administrative system of the data center. In one example, such configuration can be responsive to a request sent from the customer at the client. In other words, such configuration can be implemented according to the customer's requests, the system's automated adjustment, or some combination thereof. In one embodiment, the customer can be enabled with various provisioning options to provide commands and control connectivity between, for example, application stacks and the data center for automating the provisioning of various compute nodes, switches, and other computing resources required to extend the virtual network as suitable to include the remote network for executing workloads in a hybrid computing environment. In one embodiment, various aspects of services running in the data center are monitored by digital exchange.

In one embodiment, the method 600 further comprises monitoring one or more performances associated with the network connection.

In one embodiment, the method 600 further comprises generating configuration data for the network connection. In one example, the configuration data can include one or more resources available at the network connection. In one example, the one or more resources can include a bandwidth resource.

Figure 7:
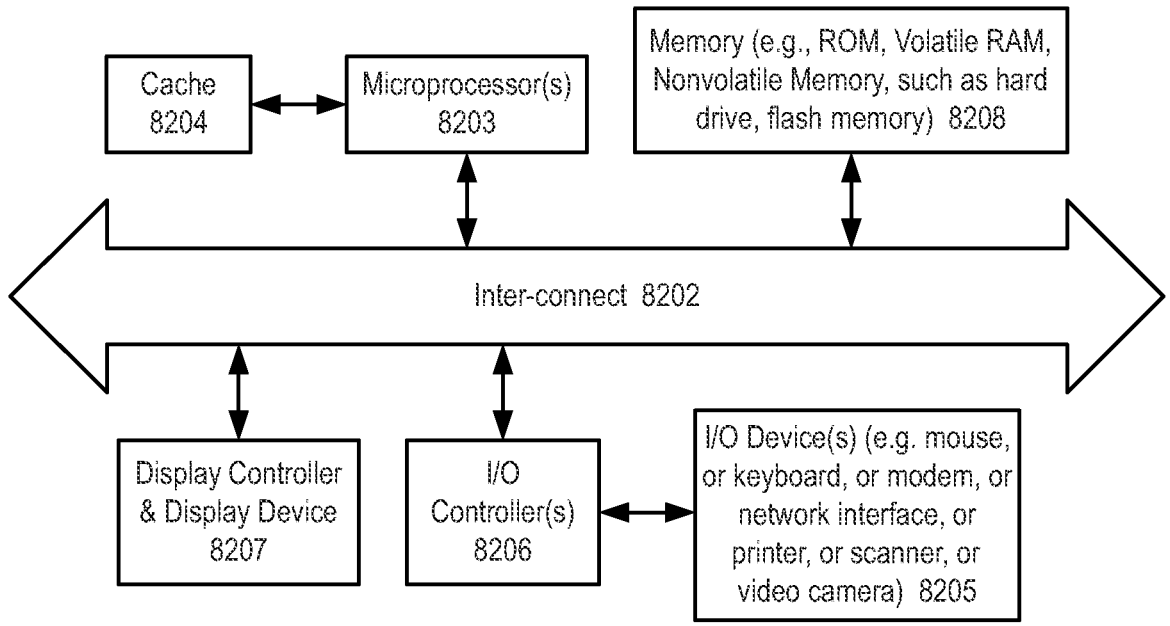
FIG. 7 shows a block diagram of a computing device, which can be used in various embodiments.

FIG. 7 shows a block diagram of a computing device, which can be used in various embodiments. While FIG. 7 illustrates various components, it is not intended to represent any particular architecture or manner of interconnecting the components. Other systems that have fewer or more components may also be used. In one embodiment, the computing device is a server. In one embodiment, several servers may be used and each reside on separate computing systems, or one or more may run on the same computing device, in various combinations.

In FIG. 7, computing device 8201 includes an inter-connect 8202 (e.g., bus and system core logic), which interconnects a microprocessor(s) 8203 and memory 8208. The microprocessor 8203 is coupled to cache memory 8204 in the example of FIG. 7.

The inter-connect 8202 interconnects the microprocessor(s) 8203 and the memory 8208 together and also interconnects them to a display controller and display device 8207 and to peripheral devices such as input/output (I/O) devices 8205 through an input/output controller(s) 8206. Typical I/O devices include mice, keyboards, modems, network interfaces, printers, scanners, video cameras and other devices which are well known in the art.

The inter-connect 8202 may include one or more buses connected to one another through various bridges, controllers and/or adapters. In one embodiment the I/O controller 8206 includes a USB (Universal Serial Bus) adapter for controlling USB peripherals, and/or an IEEE-1394 bus adapter for controlling IEEE-1394 peripherals.

The memory 8208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a solid-state drive, magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the computing device. A non-volatile memory that is remote from the computing device, such as a network storage device coupled to the computing device through a network interface such as a modem or Ethernet interface, can also be used.

In one embodiment, a computing device as illustrated in FIG. 7 is used to implement computing device 115, computing device 125, TOR switch 105, server 107, and/or other servers.

In another embodiment, a computing device as illustrated in FIG. 7 is used to implement a user terminal or a mobile device on which an application is installed or being installed. A user terminal may be in the form of, for example, a laptop or notebook computer, or a personal desktop computer.

In some embodiments, one or more servers can be replaced with the service of a peer to peer network of a plurality of data processing systems, or a network of distributed computing systems. The peer to peer network, or a distributed computing system, can be collectively viewed as a computing device.

Embodiments of the disclosure can be implemented via the microprocessor(s) 8203 and/or the memory 8208. For example, the functionalities described can be partially implemented via hardware logic in the microprocessor(s) 8203 and partially using the instructions stored in the memory 8208. Some embodiments are implemented using the microprocessor(s) 8203 without additional instructions stored in the memory 8208. Some embodiments are implemented using the instructions stored in the memory 8208 for execution by one or more general purpose microprocessor(s) 8203. Thus, the disclosure is not limited to a specific configuration of hardware and/or software.

Figure 8:
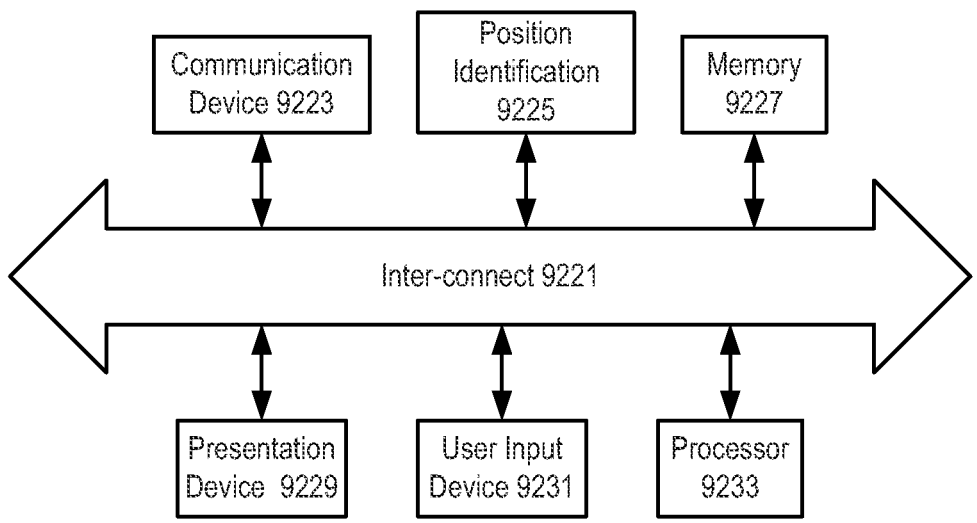
FIG. 8 shows a block diagram of a computing device, according to one embodiment.

FIG. 8 shows a block diagram of a computing device, according to one embodiment. In one embodiment, the computing device of FIG. 8 is used to implement client device 137. In FIG. 8, the computing device includes an inter-connect 9221 connecting the presentation device 9229, user input device 9231, a processor 9233, a memory 9227, a position identification unit 9225 and a communication device 9223.

In FIG. 8, the position identification unit 9225 is used to identify a geographic location. The position identification unit 9225 may include a satellite positioning system receiver, such as a Global Positioning System (GPS) receiver, to automatically identify the current position of the computing device.

In FIG. 8, the communication device 9223 is configured to communicate with a server to provide data, including configuration data and/or an image from a camera of the computing device. In one embodiment, the user input device 9231 is configured to receive or generate user data or content. The user input device 9231 may include a text input device, a still image camera, a video camera, and/or a sound recorder, etc.

The disclosure includes various devices which perform the methods and implement the systems described above, including data processing systems which perform these methods, and computer readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, "coupled to" generally refers to a connection between components, which can be an indirect communicative connection or direct communicative connection (e.g., without intervening components), whether wired or wireless, including connections such as electrical, optical, magnetic, etc.

In this description, various functions and operations may be described as being performed by or caused by software code to simplify description. However, those skilled in the art will recognize what is meant by such expressions is that the functions result from execution of the code by one or more processors, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a tangible or non-transitory machine readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by a computing device.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface.

Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system and the memory sub-system. The host system can further utilize an NVM Express (NVMe) interface to access memory components of the memory sub-system when the memory sub-system is coupled with the host system by the PCIe interface. The physical host interface can provide an interface for passing control, address, data, and other signals between the memory sub-system and the host system. In general, the host system can access multiple memory sub-systems via a same communication connection, multiple separate communication connections, and/or a combination of communication connections.

In one embodiment, the host system includes a processing device and a controller. The processing device of the host system can be, for example, a microprocessor, a graphics processing unit, a central processing unit (CPU), an FPGA, a processing core of a processor, an execution unit, etc. In one example, the processing device can be a single package that combines an FPGA and a microprocessor, in which the microprocessor does most of the processing, but passes off certain predetermined, specific tasks to an FPGA block. In one example, the processing device is a soft microprocessor (also sometimes called softcore microprocessor or a soft processor), which is a microprocessor core implemented using logic synthesis. The soft microprocessor can be implemented via different semiconductor devices containing programmable logic (e.g., ASIC, FPGA, or CPLD).

In some examples, the controller is a memory controller, a memory management unit, and/or an initiator. In one example, the controller controls the communications over a bus coupled between the host system and the memory sub-system.

In general, the controller can send commands or requests to the memory sub-system for desired access to the memory components. The controller can further include interface circuitry to communicate with the memory sub-system. The interface circuitry can convert responses received from the memory sub-system into information for the host system. The controller of the host system can communicate with the controller of the memory sub-system to perform operations such as reading data, writing data, or erasing data at the memory components and other such operations.

In some instances, a controller can be integrated within the same package as the processing device. In other instances, the controller is separate from the package of the processing device. The controller and/or the processing device can include hardware such as one or more integrated circuits and/or discrete components, a buffer memory, a cache memory, or a combination thereof. The controller and/or the processing device can be a microcontroller, special purpose logic circuitry (e.g., a field programmable gate array (FPGA), an application specific integrated circuit (ASIC), etc.), or another suitable processor.

The memory components can include any combination of the different types of non-volatile memory components and/or volatile memory components. An example of non-volatile memory components includes a negative-and (NAND) type flash memory. Each of the memory components can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system. Although non-volatile memory components such as NAND type flash memory are described, the memory components can be based on any other type of memory such as a volatile memory.

In some embodiments, the memory components can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components can be grouped as memory pages or data blocks that can refer to a unit of the memory component used to store data.

The controller of the memory sub-system can communicate with the memory components to perform operations such as reading data, writing data, or erasing data at the memory components and other such operations (e.g., in response to commands scheduled on a command bus by a controller). A controller can include a processing device (processor) configured to execute instructions stored in local memory. The local memory of the controller can include an embedded memory configured to store instructions for performing various processes, operations, logic flows, and routines that control operation of the memory sub-system, including handling communications between the memory sub-system and the host system. In some embodiments, the local memory can include memory registers storing memory pointers, fetched data, etc. The local memory can also include read-only memory (ROM) for storing micro-code. While the example memory sub-system includes the controller, in another embodiment of the present disclosure, a memory sub-system may not include a controller, and can instead rely upon external control (e.g., provided by an external host, or by a processor or controller separate from the memory sub-system).

In general, the controller can receive commands or operations from the host system and can convert the commands or operations into instructions or appropriate commands to achieve the desired access to the memory components. The controller can be responsible for other operations such as wear leveling operations, garbage collection operations, error detection and error-correcting code (ECC) operations, encryption operations, caching operations, and address translations between a logical block address and a physical block address that are associated with the memory components. The controller can further include host interface circuitry to communicate with the host system via the physical host interface. The host interface circuitry can convert the commands received from the host system into command instructions to access the memory components as well as convert responses associated with the memory components into information for the host system.

The memory sub-system can also include additional circuitry or components that are not illustrated. In some embodiments, the memory sub-system can include a cache or buffer (e.g., DRAM or SRAM) and address circuitry (e.g., a row decoder and a column decoder) that can receive an address from the controller and decode the address to access the memory components.

Various aspects are described below. The aspects below do not limit the generality of the foregoing discussion. It is to be appreciated that any one of aspects 1-20 below can be combined with any other one of aspects 1-20.

Aspect 1. A method comprising: receiving a request from a client to establish a network connection between a private network and a remote network, the request including a selection of a virtual network residing at the private network; establishing a transit connection between the virtual network and an exchange port established in association with the private network; establishing a first network connection between the exchange port and an intermediary cross connect network; establishing a second network connection between the intermediary cross connect network and the remote network; and extending a virtual local area network (VLAN) connected to the virtual network of the client at the private network to the remote network via the network connection, the network connection comprising the first network connections and the second network connection.

Aspect 2. The method of aspect 1, wherein the VLAN is connected to an endpoint of the remote network over a Layer 2 connection.

Aspect 3. The method of aspect 1, wherein the remote network includes a cloud network.

Aspect 4. The method of aspect 1, wherein the remote network includes a second private network hosted at a geographical location different than a geographical location of the private network.

Aspect 5. The method of aspect 1, wherein the request includes information regarding one or both of: the intermediary cross connect network, and the remote network.

Aspect 6. The method of aspect 1, wherein the exchange port at the private network is allocated based on the intermediary cross connect network.

Aspect 7. The method of aspect 1, wherein the exchange port at the private network is designated per the intermediary cross connect network and the remote network.

Aspect 8. The method of aspect 1, wherein the private network and the remote network are in communication via a WAN.

Aspect 9. The method of aspect 1, further comprising monitoring one or more performances associated with the network connection.

Aspect 10. The method of aspect 1, wherein the remote network and the intermediary cross connect network are vendor agnostic.

Aspect 11. The method of aspect 1, wherein one or more deployment algorithms are configured for the network connection responsive to the request via an administrative system.

Aspect 12. The method of aspect 1, further comprising generating configuration data for the network connection, the configuration data including one or more resources available at the network connection.

Aspect 13. The method of aspect 12, wherein the one or more resources includes a bandwidth resource.

Aspect 14. A system comprising: a processor; and a memory having stored thereon instructions which, upon being executed by the processor, causes the system to: receive a request from a client to establish a network connection between a private network and a remote network, the request including a selection of a virtual network residing at the private network; establish a transit connection between the virtual network and an exchange port established in association with the private network; establish a first network connection between the exchange port and an intermediary cross connect network; establish a second network connection between the intermediary cross connect network and the remote network; and extend a virtual local area network (VLAN) connected to the virtual network of the client at the private network to the remote network via the network connection, the network connection comprising the first network connection and the second network connection.

Aspect 15. The system of aspect 14, wherein the VLAN is connected to an endpoint of the remote network over a Layer 2 connection.

Aspect 16. The system of aspect 14, wherein the remote network includes a cloud network.

Aspect 17. The system of aspect 14, wherein the remote network includes a second private network hosted at a geographical location different than a geographical location of the private network.

Aspect 18. The system of aspect 14, wherein the request includes information regarding one or both of: the intermediary cross connect network, and the remote network.

Aspect 19. The system of aspect 14, wherein the exchange port at the private network is allocated based on the intermediary cross connect network.

Aspect 20. A non-transitory computer-readable storage medium storing computer-readable instructions, which when executed, cause a computing apparatus to: receive a request from a client to establish a network connection between a private network and a remote network, the request including a selection of a virtual network residing at the private network; establish a transit connection between the virtual network and an exchange port established in association with the private network; establish a first network connection between the exchange port and an intermediary cross connect network; establish a second network connection between the intermediary cross connect network and the remote network; and extend a virtual local area network (VLAN) connected to the virtual network of the client at the private network to the remote network via the network connection, the network connection comprising the first network connection and the second network connection.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A method comprising:
   receiving a request from a client to establish a network connection between a private network and a remote network, the request including a selection of a virtual network residing at the private network;
   establishing a transit connection between the virtual network and an exchange port established in association with the private network;
   establishing a first network connection between the exchange port and an intermediary cross connect network;
   establishing a second network connection between the intermediary cross connect network and the remote network; and
   extending a virtual local area network (VLAN) connected to the virtual network of the client at the private network to the remote network via the network connection, the network connection comprising the first network connection and the second network connection.

2. The method of claim 1, wherein the VLAN is connected to an endpoint of the remote network over a Layer 2 connection.

3. The method of claim 1, wherein the remote network includes a cloud network.

4. The method of claim 1, wherein the remote network includes a second private network hosted at a geographical location different than a geographical location of the private network.

5. The method of claim 1, wherein the request includes information regarding one or both of: the intermediary cross connect network, and the remote network.

6. The method of claim 1, wherein the exchange port at the private network is allocated based on the intermediary cross connect network.

7. The method of claim 1, wherein the exchange port at the private network is designated per the intermediary cross connect network and the remote network.

8. The method of claim 1, wherein the private network and the remote network are in communication via a Wide Area Network (WAN).

9. The method of claim 1, further comprising monitoring one or more performances associated with the network connection.

10. The method of claim 1, wherein the remote network and the intermediary cross connect network are vendor agnostic.

11. The method of claim 1, wherein one or more deployment algorithms are configured for the network connection responsive to the request via an administrative system.

12. The method of claim 1, further comprising generating configuration data for the network connection, the configuration data including one or more resources available at the network connection.

13. The method of claim 12, wherein the one or more resources includes a bandwidth resource.

14. A system comprising:
   a processor; and
   a memory for tangibly storing thereon computer-readable instructions configured to be executed by the processor, the computer-readable instructions configured to:
   receive a request from a client to establish a network connection between a private network and a remote network, the request including a selection of a virtual network residing at the private network;
   establish a transit connection between the virtual network and an exchange port established in association with the private network;
   establish a first network connection between the exchange port and an intermediary cross connect network;
   establish a second network connection between the intermediary cross connect network and the remote network; and
   extend a virtual local area network (VLAN) connected to the virtual network of the client at the private network to the remote network via the network connection, the network connection comprising the first network connection and the second network connection.

15. The system of claim 14, wherein the VLAN is connected to an endpoint of the remote network over a Layer 2 connection.

16. The system of claim 14, wherein the remote network includes a cloud network.

17. The system of claim 14, wherein the remote network includes a second private network hosted at a geographical location different than a geographical location of the private network.

18. The system of claim 14, wherein the request includes information regarding one or both of: the intermediary cross connect network, and the remote network.

19. The system of claim 14, wherein the exchange port at the private network is allocated based on the intermediary cross connect network.

20. A non-transitory computer-readable storage medium storing computer-readable instructions, which when executed, cause a computing apparatus to:
- receive a request from a client to establish a network connection between a private network and a remote network, the request including a selection of a virtual network residing at the private network;
- establish a transit connection between the virtual network and an exchange port established in association with the private network;
- establish a first network connection between the exchange port and an intermediary cross connect network;
- establish a second network connection between the intermediary cross connect network and the remote network; and
- extend a virtual local area network (VLAN) connected to the virtual network of the client at the private network to the remote network via the network connection, the network connection comprising the first network connection and the second network connection.

* * * * *